United States Patent
Worsham, II et al.

(10) Patent No.: US 10,890,924 B2
(45) Date of Patent: Jan. 12, 2021

(54) SYSTEM AND METHOD FOR ROTORCRAFT OFFSHORE APPROACH

(71) Applicant: Textron Innovations Inc., Providence, RI (US)

(72) Inventors: Robert Earl Worsham, II, Weatherford, TX (US); Troy Caudill, Burleson, TX (US); Luke Dafydd Gillett, Grapevine, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 228 days.

(21) Appl. No.: 15/961,439

(22) Filed: Apr. 24, 2018

(65) Prior Publication Data
US 2019/0056753 A1 Feb. 21, 2019

Related U.S. Application Data

(60) Provisional application No. 62/547,040, filed on Aug. 17, 2017.

(51) Int. Cl.
*G05D 1/06* (2006.01)
*B64D 45/08* (2006.01)
(Continued)

(52) U.S. Cl.
CPC ........... *G05D 1/0684* (2013.01); *B64D 45/08* (2013.01); *G01C 21/20* (2013.01); *G01C 23/00* (2013.01);
(Continued)

(58) Field of Classification Search
CPC .... G05D 1/0684; G05D 1/0676; G05D 1/101; B64D 45/08; B64D 45/04; G01C 23/00;
(Continued)

(56) References Cited

U.S. PATENT DOCUMENTS 4,577,275 A * 3/1986 Adams ................. G05D 1/0676
244/17.13
8,442,706 B2 5/2013 Doeppner et al.
(Continued)

FOREIGN PATENT DOCUMENTS

FR 3002675 A1 8/2014
FR 3006800 A1 12/2014
(Continued)

OTHER PUBLICATIONS

U.S. Department of Transportation Federal Aviation Administration, "Approval of Offshore Standard Approach Procedures, Airborne Radar Approaches, and Helicopter En Route Descent Areas", Advisory Circular, Dec. 21, 2017, 71 pages.

*Primary Examiner* — Adam R Mott
(74) *Attorney, Agent, or Firm* — Slater Matsil, LLP

(57) ABSTRACT

An embodiment rotorcraft includes a rotor system including a plurality of blades; a control assembly operable to receive commands from a pilot; a flight control system (FCS), the flight control system operable to control flight of the rotorcraft by changing an operating condition of the rotor system; and a flight management system (FMS) in signal communication with the control assembly and the FCS. The FMS is operable to receive a target location and a plurality of approach parameters from the control assembly; generate a plurality of waypoints between a current location of the rotorcraft and a missed approach point (MAP) based on the target location and the plurality of approach parameters; receive a command to engage in an approach maneuver from the control assembly; and in response to the command to engage in the approach maneuver, instruct the FCS to fly to the MAP.

20 Claims, 17 Drawing Sheets

(51) Int. Cl.
  *G01C 23/00* (2006.01)
  *G01C 21/20* (2006.01)
  *B64C 27/04* (2006.01)
  *G08G 5/02* (2006.01)

(52) U.S. Cl.
  CPC ............ *G05D 1/0676* (2013.01); *B64C 27/04* (2013.01); *G01C 23/005* (2013.01); *G08G 5/025* (2013.01)

(58) Field of Classification Search
  CPC ...... G01C 21/20; G01C 23/005; B64C 27/04; B64C 13/18; B64C 13/22; B64C 19/02; B64C 27/57; G08G 5/025
  See application file for complete search history.

(56) References Cited

U.S. PATENT DOCUMENTS

| | | | |
|---|---|---|---|
| 8,918,234 B2 | 12/2014 | Covington et al. | |
| 9,151,637 B2 | 10/2015 | Canale et al. | |
| 9,189,963 B2 | 11/2015 | Iraudo et al. | |
| 9,611,053 B2 | 4/2017 | Canale et al. | |
| 2014/0244079 A1 | 8/2014 | Iraudo et al. | |
| 2014/0339372 A1* | 11/2014 | Dekel | B64C 39/024 244/7 R |
| 2015/0314855 A1* | 11/2015 | Luszcz | B64O 27/72 701/3 |
| 2015/0375872 A1 | 12/2015 | Canale et al. | |
| 2016/0137289 A1* | 5/2016 | Violette | B64O 19/00 701/14 |
| 2017/0210466 A1* | 7/2017 | Cherepinsky | G05D 1/0669 |
| 2018/0130363 A1* | 5/2018 | Yvetot | G01O 23/00 |

FOREIGN PATENT DOCUMENTS

| | | |
|---|---|---|
| WO | 2010077531 A2 | 7/2010 |
| WO | 2014092563 A1 | 6/2014 |

\* cited by examiner

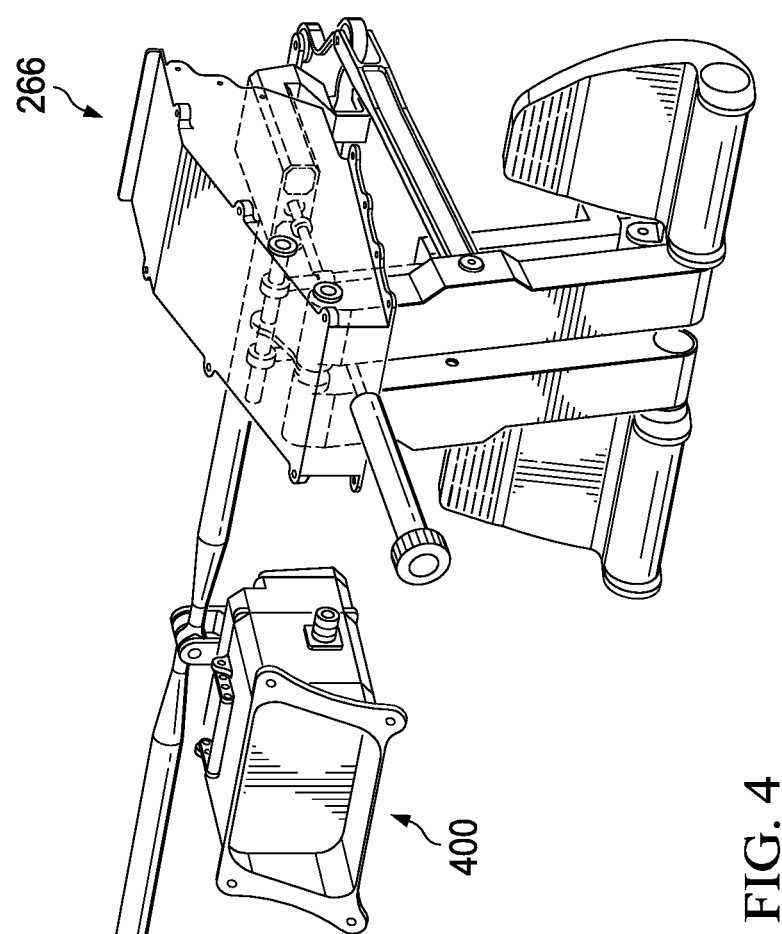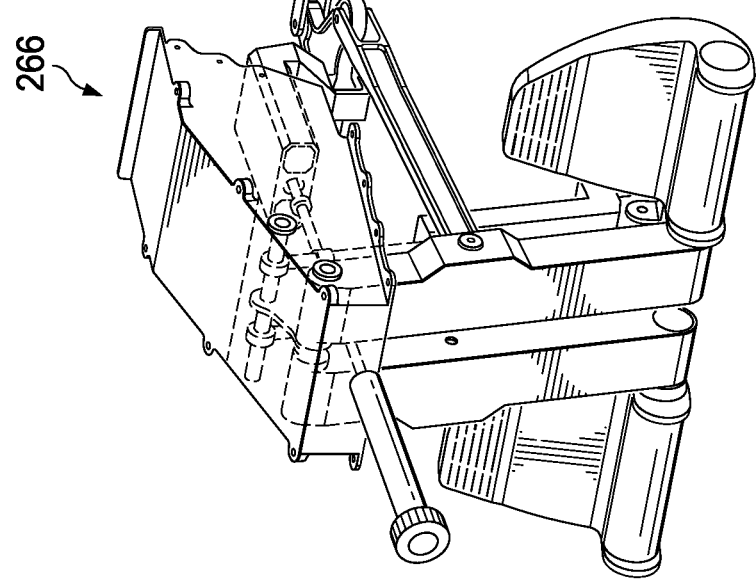
FIG. 4

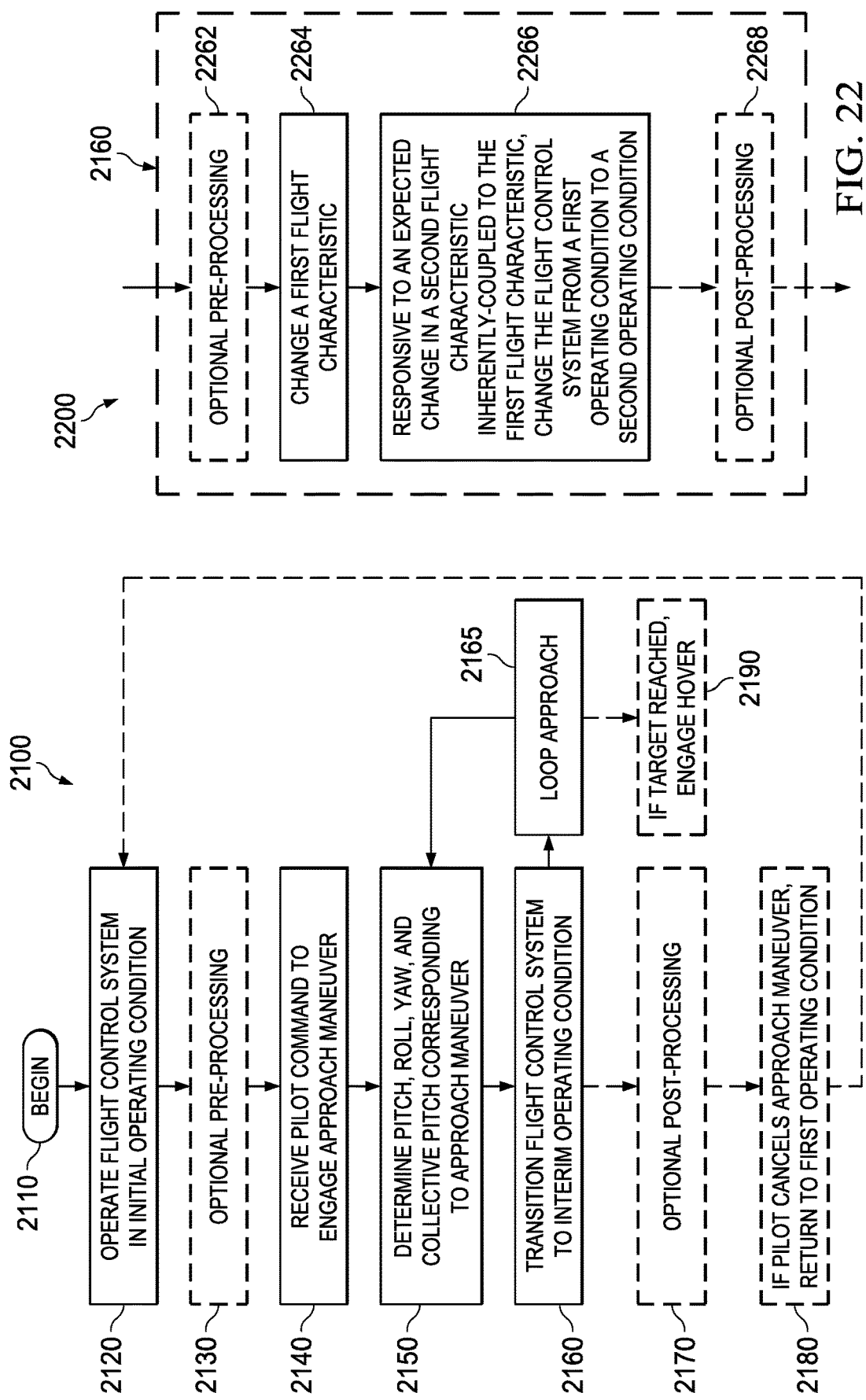

US 10,890,924 B2

SYSTEM AND METHOD FOR ROTORCRAFT OFFSHORE APPROACH

CROSS-REFERENCE TO RELATED APPLICATIONS

This application claims the benefit of U.S. Provisional Application No. 62/547,040, filed on Aug. 17, 2017, titled "System and Method for Rotorcraft Offshore Approach," which application is hereby incorporated by reference in its entirety.

TECHNICAL FIELD

The present disclosure generally relates to aircraft flight control systems, and more particularly, to rotorcraft fly-by-wire (FBW) control laws. In particular embodiments, the present disclosure relates to a system and method for automating an offshore approach for a rotorcraft.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

In accordance with an embodiment, a rotorcraft includes a rotor system including a plurality of blades; a control assembly operable to receive commands from a pilot; a flight control system (FCS), the flight control system operable to control flight of the rotorcraft by changing an operating condition of the rotor system; and a flight management system (FMS) in signal communication with the control assembly and the FCS, the FMS being operable to receive a target location and a plurality of approach parameters from the control assembly; generate a plurality waypoints between a current location of the rotorcraft and a missed approach point (MAP) based on the target location and the plurality of approach parameters; receive a command to engage in an approach maneuver from the control assembly; and in response to the command to engage in the approach maneuver, instruct the FCS to fly to the MAP.

In another embodiment, a method for operating a rotorcraft includes inputting approach data into a flight management system (FMS), the flight control data including a target location, the target location including an offshore location; generating a plurality of waypoints in a flight path between a current location of the rotorcraft and a missed approach point (MAP) based on the approach data; commanding the FMS to engage in an approach maneuver; and altering a flight condition of the rotorcraft to fly the rotorcraft through each waypoint of the plurality of waypoints to the MAP.

In yet another embodiment, a device for a rotorcraft includes a processor; and a non-transitory computer-readable storage medium storing a program to be executed by the processor, the program including instructions for performing an offshore approach maneuver, the instructions for performing the offshore approach maneuver including instructions for generating a flight path in response to a user entering approach data, the flight path including a plurality of waypoints between a current location of the rotorcraft and a missed approach point (MAP), the approach data comprising a target location, the target location including an offshore location; and instructing the flight control system (FCS) to fly the rotorcraft to the MAP in response to the user entering an engage approach command.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a configuration of pedal assemblies according to some embodiments;

FIG. 21 illustrates a method for performing an offshore standard approach procedure according to some embodiments;

FIG. 22 illustrates a step of a method for performing an offshore standard approach procedure in greater detail according to some embodiments;

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
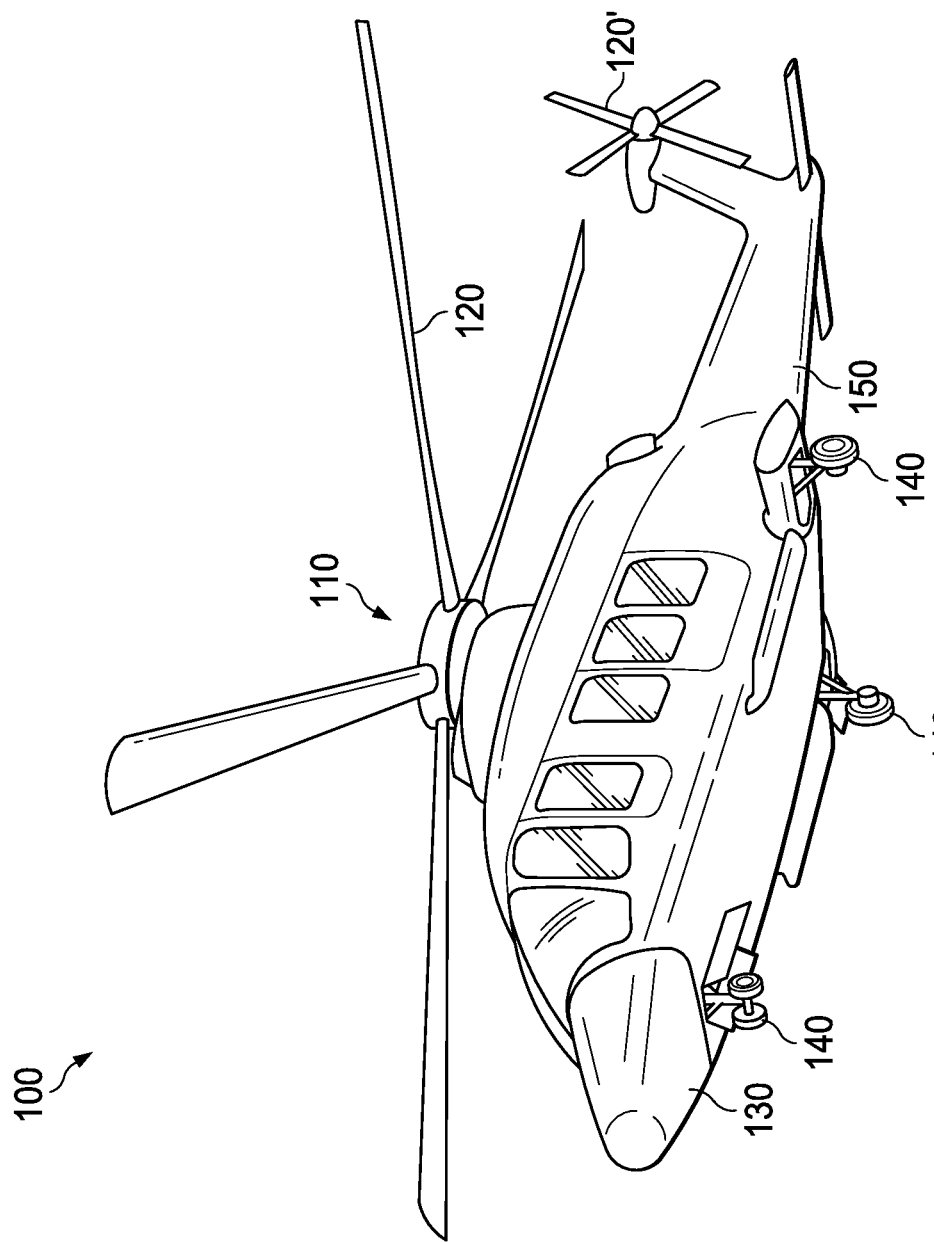
FIG. 1 illustrates a rotorcraft according to some embodiments.

FIG. 1 illustrates a rotorcraft 100 according to a representative embodiment. The rotorcraft 100 includes a rotor system 110, main rotor blades 120, a fuselage 130, landing gear 140, and a tail boom 150. The rotor system 110 may rotate the main rotor blades 120. The rotor system 110 may include a control system for selectively controlling a pitch of each of the main rotor blades 120 to selectively control the direction, thrust, and lift of the rotorcraft 100. The fuselage 130 comprises the body of the rotorcraft 100 and may be coupled to the rotor system 110 such that the rotor system 110 and the main rotor blades 120 move the fuselage 130 through the air in flight. The landing gear 140 supports the rotorcraft 100 during landing or when the rotorcraft 100 is at rest on the ground. The tail boom 150 represents the rear section of the rotorcraft 100 and has components of the rotor system 110 and tail rotor blades 120'. The tail rotor blades 120' counter torque effect created by the rotor system 110 and the main rotor blades 120. Teachings of certain embodiments relating to rotor systems described herein may apply to the rotor system 110 or other rotor systems (e.g., tilt rotorcraft, tandem rotorcraft, or other helicopter rotor systems). It should also be appreciated that representative embodiments of the rotorcraft 100 may apply to aircraft other than rotorcraft, such as airplanes, unmanned aircraft, or the like.

A pilot may manipulate one or more pilot flight controls to achieve controlled aerodynamic flight. Inputs provided by the pilot to the pilot flight controls may be transmitted mechanically or electronically (for example, via a fly-by-wire system) to flight control devices. The flight control devices may include devices operable to change flight characteristics of the aircraft. Representative flight control devices may include a control system operable to change a configuration of the main rotor blades 120 or the tail rotor blades 120'.

In some embodiments, the rotorcraft 100 may include a flight control system (FCS) and a flight control computer (FCC). The FCC is in electrical communication with the FCS and the FCC controls the FCS. Inputs from the pilot are sent to the FCC and the FCC controls the FCS based on the pilot inputs, control laws, other logic, and the like.

Figure 2:
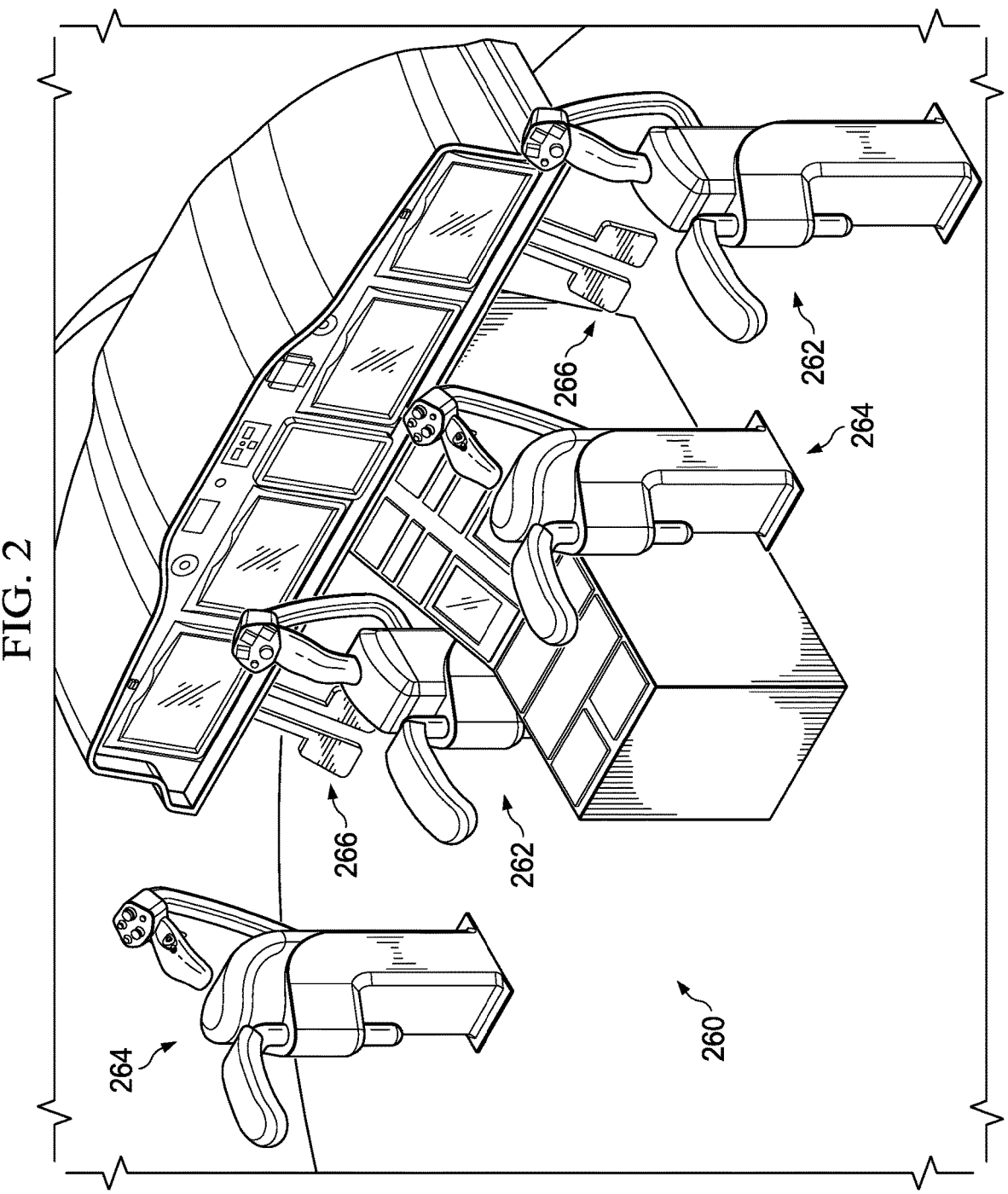
FIG. 2 illustrates a cockpit configuration of a rotorcraft according to some embodiments.

FIG. 2 illustrates a cockpit configuration 260 of the rotorcraft 100 according to a representative embodiment. The rotorcraft 100 may include, e.g., three sets of pilot flight controls (e.g., cyclic control assemblies 262, collective control assemblies 264, and pedal assemblies 266). In accordance with a representative embodiment, a pilot and a co-pilot (both of which may be referred to as a "pilot" for purposes of discussion herein) may each be provided with an individual pilot flight control assembly comprising a cyclic control assembly 262, a collective control assembly 264, and a pedal assembly 266.

In general, the cyclic pilot flight controls may allow a pilot to impart cyclic configurations to the main rotor blades 120. Varied cyclic configurations of the main rotor blades 120 may cause the rotorcraft 100 to tilt in a direction specified by the pilot. For tilting forward and back (pitch) or tilting side-to-side (roll), the angle of attack of the main rotor blades 120 may be altered with cyclic periodicity during the rotation of the rotor system 110, thereby creating variable amounts of lift at varied points in the rotation cycle. Alteration of the cyclic configuration of the main rotor blades 120 may be accomplished by an input from the cyclic control assembly 262.

The collective pilot flight controls may allow a pilot to impart collective configurations (e.g., collective blade pitch) to the main rotor blades 120. Collective configurations of the main rotor blades 120 may change the overall lift produced by the main rotor blades 120. For increasing or decreasing the overall lift in the main rotor blades 120, the angle of attack for all of the main rotor blades 120 may be collectively altered by equal amounts and at the same time, resulting in ascent, descent, acceleration, or deceleration. Alteration of the collective configuration of the main rotor blades 120 may be accomplished by input from the collective control assembly 264.

Anti-torque pilot flight controls may allow a pilot to change the amount of anti-torque force applied to the rotorcraft 100. The tail rotor blades 120' may operate to counter torque created by the rotor system 110 and the main rotor blades 120. The anti-torque pilot flight controls may change the amount of anti-torque force applied to change a heading (yaw) of the rotorcraft 100. For example, providing anti-torque force greater than the torque effect created by the rotor system 110 and the main rotor blades 120 may cause the rotorcraft 100 to rotate in a first direction, whereas providing anti-torque force less than the torque effect created by the rotor system 110 and the main rotor blades 120 may cause the rotorcraft 100 to rotate in a second direction opposite the first direction. In some embodiments, the anti-torque pilot flight controls may change the amount of anti-torque force applied by changing the pitch of the tail rotor blades 120', thereby increasing or reducing the thrust produced by the tail rotor blades 120' and causing the nose of the rotorcraft 100 to yaw in a direction corresponding to the application of input from the pedal assembly 266.

In other embodiments, the rotorcraft 100 may include additional or different anti-torque devices, such as a rudder or a no-tail-rotor (NOTAR) anti-torque device. Conjunctive or alternative anti-torque embodiments may be operable to change an amount of anti-torque force provided by such additional or different anti-torque device or system.

In some embodiments, the cyclic control assembly 262, the collective control assembly 264, and the pedal assemblies 266 may be used in a fly-by-wire (FBW) system. In an example as representatively illustrated in FIG. 2, each cyclic control assembly 262 is located to the right of a pilot seat, each collective control assembly 264 is located to the left of the pilot seat, and each pedal assembly 266 is located in front of the pilot seat. In other embodiments, the cyclic control assemblies 262, the collective control assemblies 264, and the pedal assemblies 266 may be disposed in any suitable location of a cockpit configuration.

In some embodiments, the cyclic control assembly 262, the collective control assembly 264, and the pedal assemblies 266 may be in mechanical communication with trim assemblies that convert mechanical inputs into FBW system flight control commands. These trim assemblies may include, among other items, measurement devices for measuring mechanical inputs (e.g., measuring or otherwise determining input position) and trim motors for back-driving center positions of the cyclic control assembly 262, the collective control assembly 264, or the pedal assemblies 266.

Figure 3:
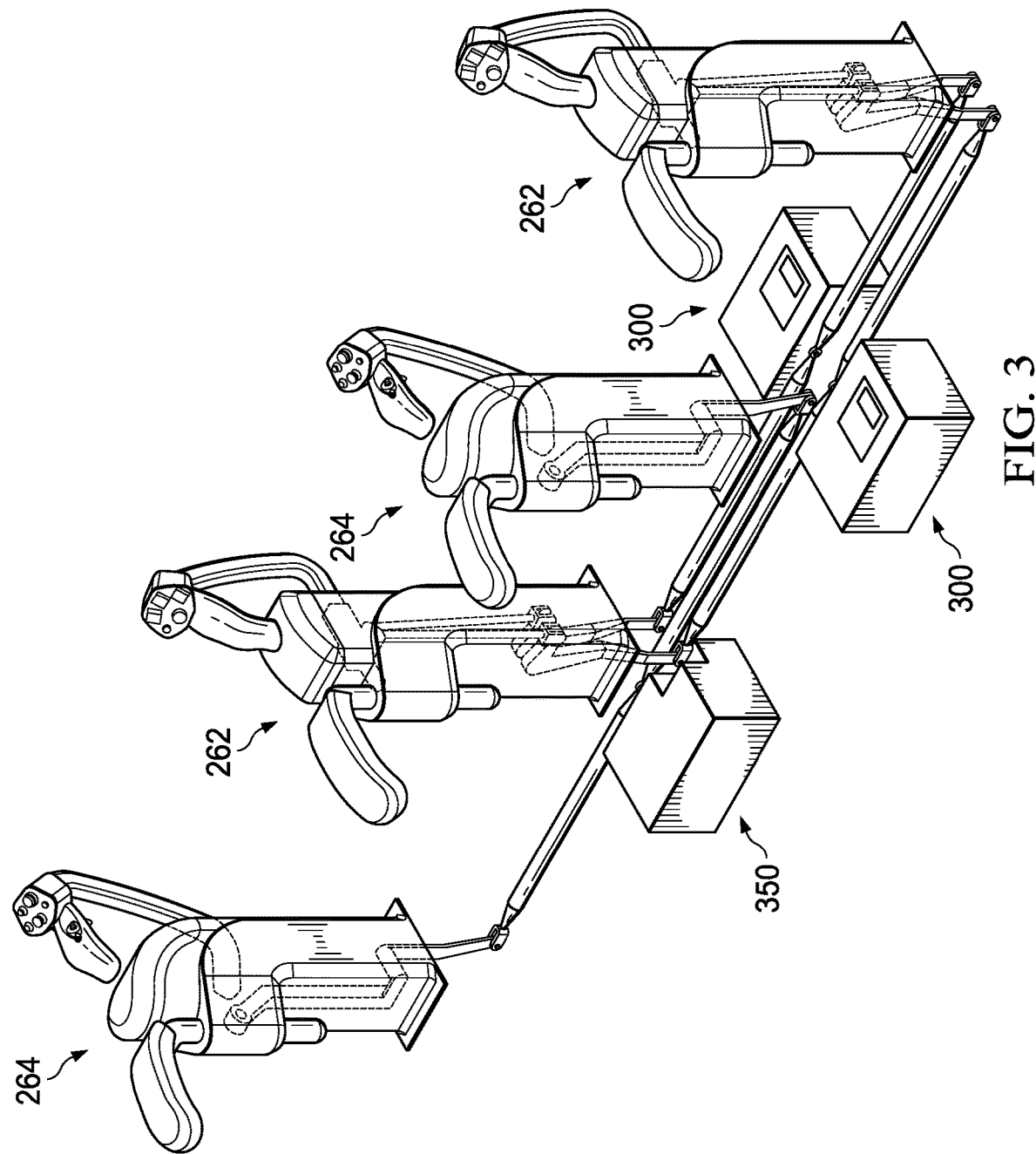
FIG. 3 illustrates a configuration of cockpit configuration of a rotorcraft according to some embodiments.

For example, FIG. 3 representatively illustrates an installation of two cyclic control assemblies 262 and two collective control assemblies 264 according to an embodiment. In this example, the cyclic control assemblies 262 and the collective control assemblies 264 are coupled to three integrated trim assemblies: two cyclic trim assemblies 300 and a collective trim assembly 350. One of the cyclic trim assemblies 300 manages left/right cyclic tilting movements (e.g., roll) and the other cyclic trim assembly 300 manages front/back cyclic tilting movements (e.g., pitch).

The cyclic trim assemblies 300 and the collective trim assembly 350 are operable to receive and measure mechanical communications of cyclic and collective motions from a pilot. In a representative aspect, the cyclic trim assemblies 300 and the collective trim assembly 350 may embody components of an FBW flight control system, and measurements from the cyclic trim assemblies 300 and the collective trim assembly 350 may be sent to the flight control computer (FCC) operable to instruct the rotor system 110 to change a position or configuration of the main rotor blades 120 based on received or otherwise determined measurements. For example, the FCC may be in communication with actuators or other devices operable to change the pitch or position of the main rotor blades 120.

FIG. 4 representatively illustrates an installation of pedal assemblies 266 in accordance with an embodiment. Two pedal assemblies 266 are coupled to an anti-torque trim assembly 400. Pedal linkages are in mechanical communication, e.g., via a rocker arm and pedal adjustment linkages. The rocker arm is operable to rotate about a point of rotation such that pushing in one pedal causes the pedal adjustment linkage to rotate the rocker arm, which in turn causes the pedal adjustment linkage to push out the other pedal in a corresponding opposite direction.

Rotating the rocker arm also causes a trim linkage to reposition a mechanical input associated with the anti-torque trim assembly 400. In this manner, the pilot can mechanically communicate anti-torque commands to the anti-torque trim assembly 400 by moving the pedals. Furthermore, trim linkages couple adjacent pedal assemblies 266 together such that pilot pedals and co-pilot pedals are in mechanical communication.

Figure 5:
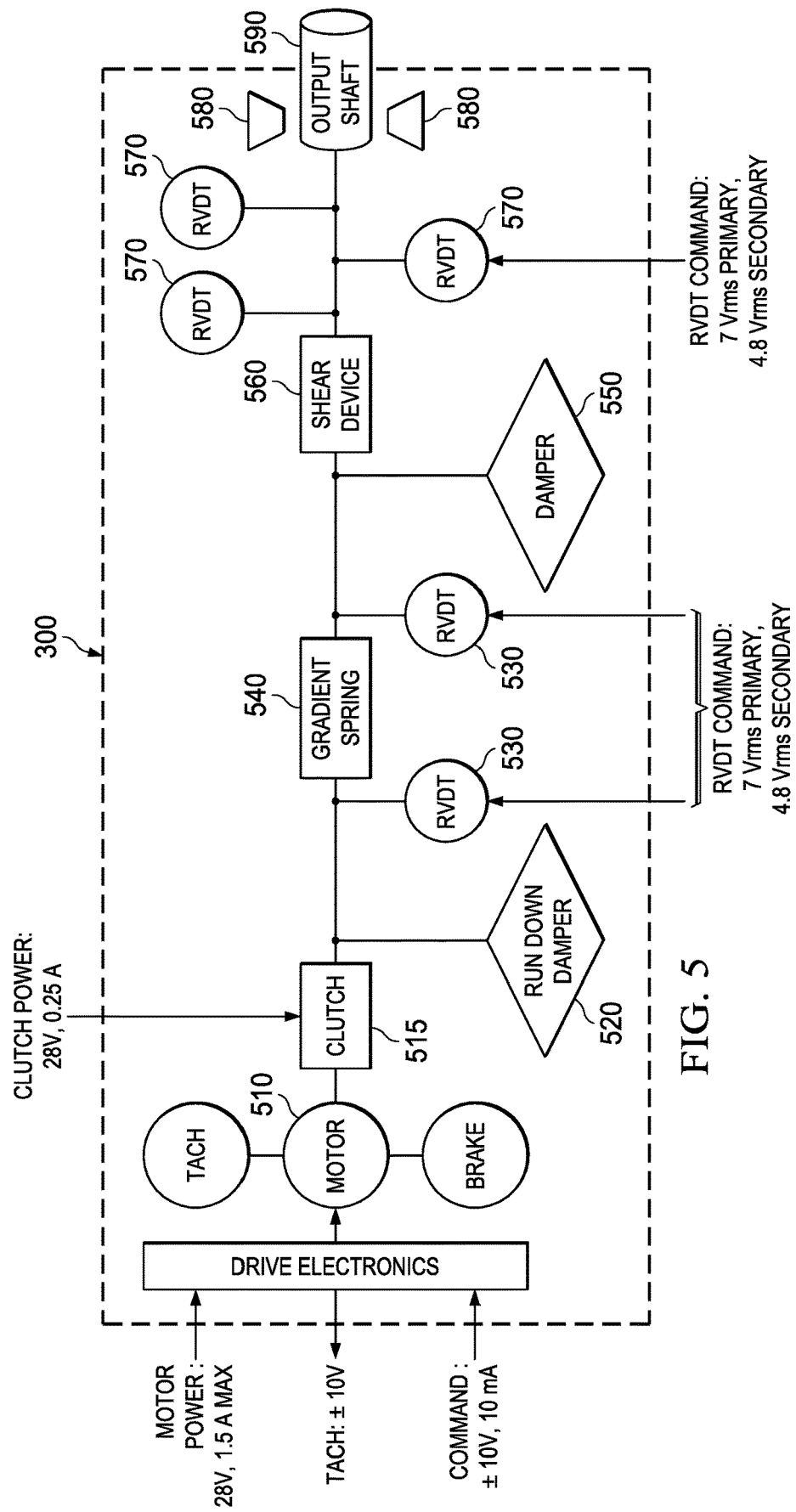
FIG. 5 illustrates a cyclic trim assembly according to some embodiments.
Figure 6:
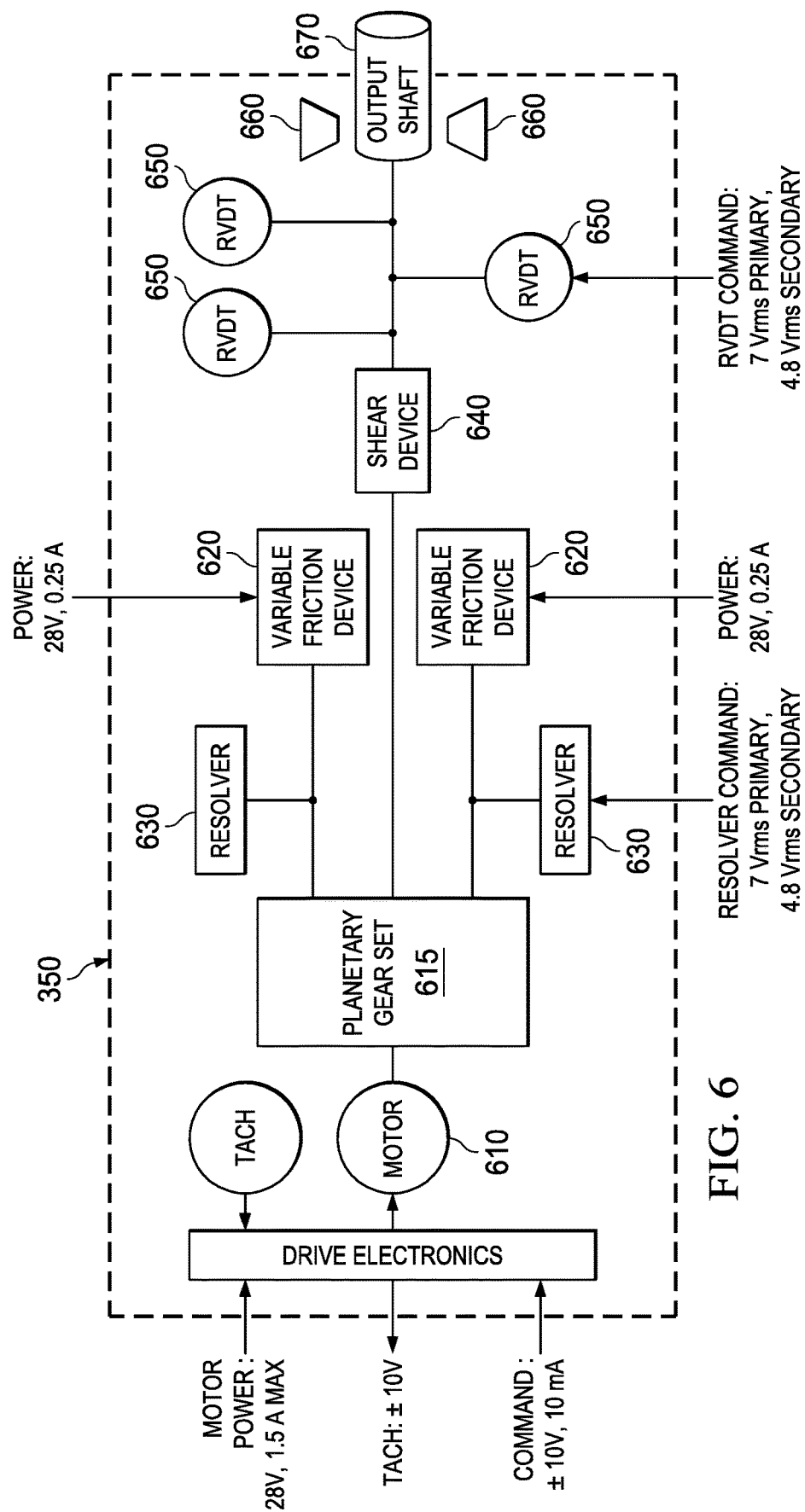
FIG. 6 illustrates a collective trim assembly according to some embodiments.
Figure 7:
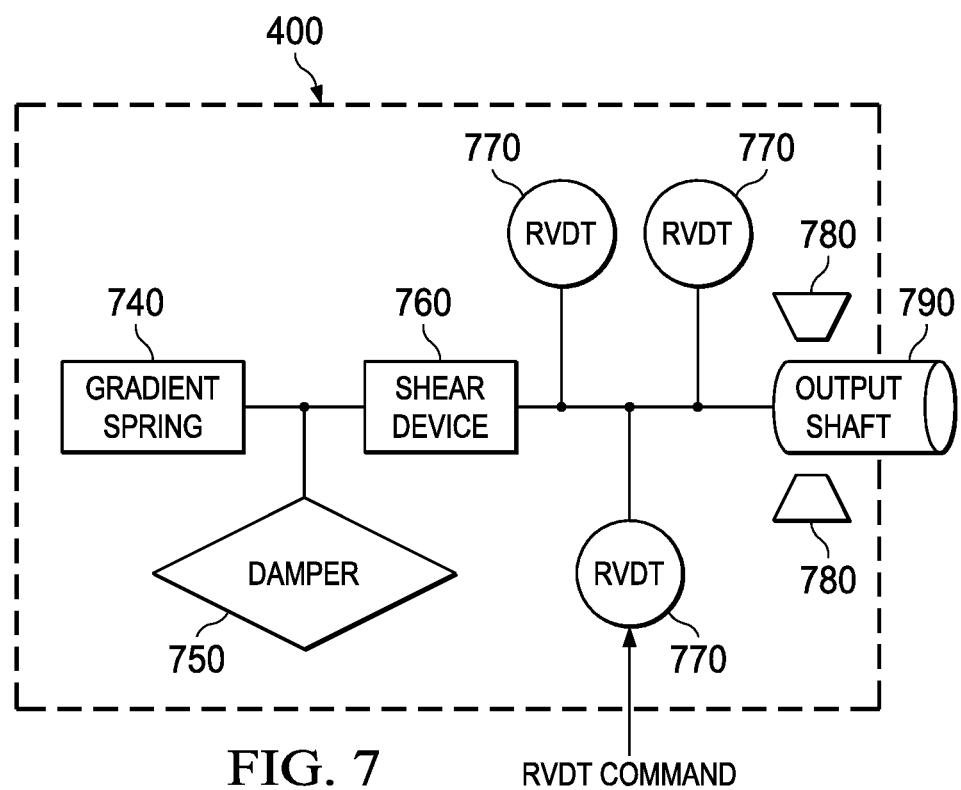
FIG. 7 illustrates an anti-torque trim assembly according to some embodiments.

FIGS. 5, 6, and 7 illustrate the trim assemblies (i.e., the cyclic trim assemblies 300, the collective control assembly 350, and the anti-torque trim assembly 400) of FIGS. 3 and 4 according to a representative embodiment. FIG. 5 shows one of the cyclic trim assemblies 300 according to an embodiment, FIG. 6 shows the collective trim assembly 350 according to an embodiment, and FIG. 7 shows the anti-torque trim assembly 400 according to an embodiment.

FIG. 5 representatively illustrates an embodiment of a cyclic trim assembly 300 having a trim motor 510, a clutch 515, a run-down damper 520, first position measurement devices 530, a gradient spring 540, a damper 550, a shear device 560, second position measurement devices 570, mechanical stop devices 580, and an output shaft 590. Although the output shaft 590 may be described as a single shaft, it will be appreciated that the output shaft 590 may have multiple components. For example, the output shaft 590 may include two shafts separated by the gradient spring 540. In another example, the output shaft 590 may have a single shaft with a torsion spring attached thereto.

In operation, according to an embodiment, the output shaft 590 and the cyclic control assemblies 262 are in mechanical communication such that movement of a pilot control assembly (PCA) grip results in movement of the output shaft 590, and movement of the output shaft 590 likewise results in movement of the PCA grip. Movement of the output shaft 590 may be measured or otherwise determined by the first position measurement devices 530 and the second position measurement devices 570. The measurements from the first position measurement devices 530 and the second position measurement devices 570 may be used to instruct the rotor system 110 to change the position of the main rotor blades 120.

The cyclic trim assembly 300 may operate in three modes of operation. In a first mode of operation, the clutch 515 is engaged and the trim motor 510 drives the output shaft 590. This first mode of operation may represent, for example, operation of the cyclic trim assembly 300 during auto-pilot operations. In this example, the trim motor 510 may drive movement of the output shaft 590 to drive movement of the PCA grip of the cyclic control assembly 262. The first position measurement devices 530 and the second measurement devices 570 may also measure how the trim motor 510 drives the output shaft 590 and communicate these measurements to the rotor system 110.

In a second mode of operation, the clutch 515 is disengaged and the pilot drives the output shaft 590 by way of the cyclic control assembly 262. In this example, the pilot changes the position of the output shaft 590, which may be measured by the first position measurement devices 530 and the second measurement devices 570. The first position measurement devices 530 and the second measurement devices 570 may measure how the pilot drives the output shaft 590 and communicate these measurements to the rotor system 110.

In a third mode of operation, the clutch 515 is engaged and the trim motor 510 holds its output arm at a trim position to provide a ground point for the output shaft 590. In this example, the pilot may change the position of the output shaft 590 about the trim position set by the trim motor 510. When the pilot releases the PCA grip, the PCA grip may move to the trim position corresponding to the position established by the trim motor 510. In some embodiments, the first and third modes of operations may be combined such that the trim motor 510 moves the trim position during operation.

Thus, trim motor the 510 may provide cyclic force (or trim) to the cyclic control assembly 262 through the output shaft 590. In an embodiment, the trim motor 510 may be a 28-volt DC permanent magnet motor. In operation, the trim motor 510 may provide an artificial-force feel (or "force feedback") for the flight control system (FCS) about an anchor point (or "detent"). The clutch 515 provides a mechanism for engaging and disengaging the trim motor 510.

FIG. 6 shows an embodiment of a collective trim assembly 350 having a trim motor 610, a planetary gear set 615, variable friction devices 620, resolvers 630, a shear device 640, position measurement devices 650, mechanical stop devices 660, and an output shaft 670. The output shaft 670 may be coupled to various linkages. Although the output shaft 670 may be described as a single shaft, it will be appreciated that the output shaft 670 may comprise multiple components or pieces.

The output shaft 670 and the collective control assemblies 264 are in mechanical communication such that movement of a PCA grip of the collective control results in movement of the output shaft 670, and movement of the output shaft 670 likewise results in movement of the PCA grip of the collective control. Movement of the output shaft 670 may be measured or otherwise determined by the position measurement devices 650. Measurements from the measurement devices 650 may be used to instruct the rotor system 110, e.g., as to how to change the position of the main rotor blades 120.

The collective trim assembly 350 may operate in three modes of operation. In a first mode of operation, the variable friction devices 620 are engaged and the trim motor 610 drives the output shaft 670. This first mode of operation may represent, for example, operation of the collective trim assembly 350 during auto-pilot operations. In this example, the trim motor 610 may drive movement of the output shaft 670 to drive movement of the PCA grip of the collective control assembly 264. The position measurement devices 650 may also measure how the trim motor 610 drives the output shaft 670 and communicate these measurements to the rotor system 110.

In a second mode of operation, the variable friction devices 620 are disengaged and the pilot drives the output shaft 670 by way of the collective control assembly 264. In this example, the pilot changes the position of the output shaft 670, which may be measured or otherwise determined by the position measurement devices 650. The position measurement devices 650 may measure or otherwise determine how the pilot drives the output shaft 670 and communicate these measurements to the rotor system 110.

In a third mode of operation, the variable friction devices 620 are engaged and the trim motor 610 holds its output arm at a trim position to provide a ground point for the output shaft 670. In this example, the pilot may change the position of the output shaft 670 about the trim position set by the trim motor 610. When the pilot releases the PCA grip, the PCA grip may move to the trim position corresponding to the position established by the trim motor 610. In some embodiments, the first and third modes of operations may be combined such that the trim motor 610 moves the trim position during operation.

Thus, the trim motor 610 may provide collective force (trim) to the collective control assembly 264 through the output shaft 670. In one example embodiment, the trim motor 610 may be a 28 volt DC permanent magnet motor. In operation, the trim motor 610 may provide an artificial force feel for the FCS about an anchor point. The variable friction devices 620 provide a mechanism for engaging and disengaging the trim motor 610.

FIG. 7 shows an embodiment of an anti-torque trim assembly 400 having a gradient spring 740, a damper 750, a shear device 760, position measurement devices 770, mechanical stop devices 780, and an output shaft 790. Although the output shaft 790 may be described as a single shaft, it will be appreciated that the output shaft 790 may comprise multiple pieces or components.

In operation, according to an embodiment, the output shaft 790 and the pedal assemblies 266 are in mechanical communication such that movement of the pedals results in movement of the output shaft 790, and movement of the output shaft 790 likewise results in movement of the pedals. Movement of the output shaft 790 may be measured or otherwise determined by the position measurement devices 770. Measurements from the measurement devices 770 may be used to instruct the rotor system 110, e.g., as to how to change the pitch of the tail rotor blades 120' (or how to change the operation of an alternative anti-torque device or system).

Although the cyclic control assembly 262, the collective control assembly 264, and the pedal assemblies 266 may generally control the cyclic, collective, and anti-torque movements of the rotorcraft 100 respectively, generally, aircraft dynamics may result in a coupling of aircraft motions (or flight characteristics). As an example, inputting a change in lateral cyclic into the cyclic control assembly 262 may result in a change in the pitch moment of the rotorcraft 100. This change in the pitch moment may occur even if no longitudinal cyclic input is provided to the cyclic control assembly 262. Rather, this change in the pitch moment would be the result of aircraft dynamics. In such an example, a pilot may apply a counteracting longitudinal cyclic input to compensate for the change in pitch moment. Accordingly, coupling of aircraft flight characteristics generally increases pilot workload.

Different aircrafts may be associated with different couplings of aircraft motions. For example, a rotorcraft with a canted tail rotor may be associated with a high level of coupling due to the "lift" generated by the canted tail rotor combined with normal coupling of yaw motion to collective pitch and coupling of cyclic inputs of conventional single-rotor rotorcraft. In such an example, feedback loops may not be sufficient to compensate for this coupling because feedback loops do not engage until after the coupled response occurs.

Figure 8:
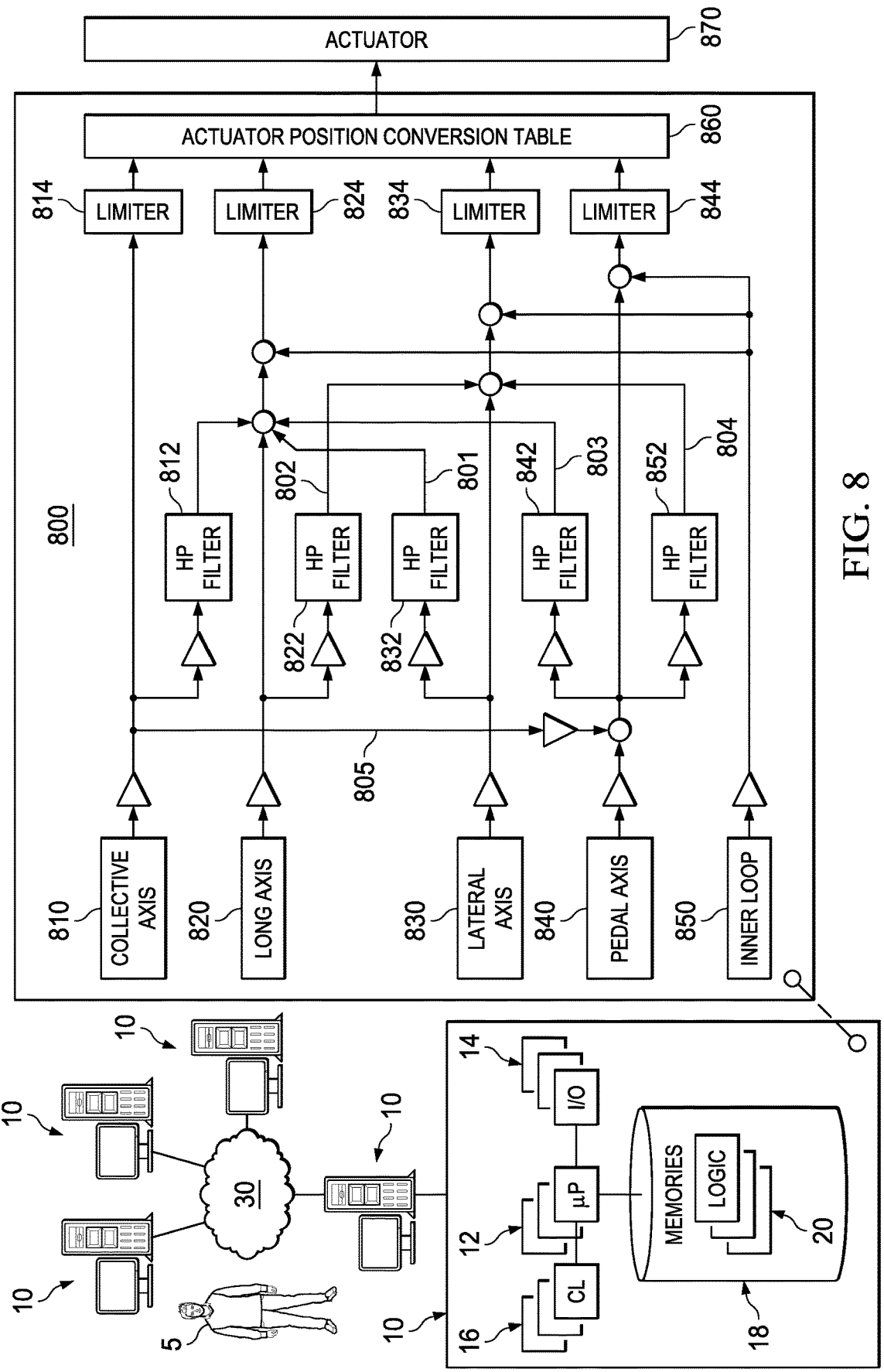
FIG. 8 illustrates a fly-by-wire cross-feed arrangement according to some embodiments.

Accordingly, rotorcraft fly-by-wire systems described herein recognize the capability to augment flight control commands with feed-forward control cross-feeds that anticipate inherent coupling of aircraft motions. FIG. 8 shows a fly-by-wire cross-feed arrangement 800. As shown in FIG. 8, the cross-feed arrangement 800 has five inputs: a collective axis input 810, a longitudinal cyclic axis input 820, a lateral cyclic axis input 830, a pedal axis input 840, and an inner loop input 850. Examples of the inner loop input 850 will be discussed later with regard to description of FIG. 9.

As representatively illustrated in FIG. 8, each input may be cross-fed to a different axis. In some examples, high-pass filters (e.g., a first high-pass filter 812, a second high-pass filter 822, a third high-pass filter 832, a fourth high-pass filter 842, and a fifth high-pass filter 852) may be used to filter cross-feed signals by allowing high-frequency signals to pass, but attenuating frequencies lower than a cut-off frequency. Fixed gains are applied to the inputs before passing the inputs through the high-pass filters. The cross-feed signals may then be passed through a limiter (e.g., a first limiter 814, a second limiter 824, a third limiter 834, or a fourth limiter 844) to an actuator position converter 860, which processes the signals and converts them into instructions for one or more actuators 870. Each of the actuators 870 may represent any device that provides flight control inputs to a flight control device. Examples of the actuators 870 may include, but are not limited to, a swashplate actuator, a pitch-link actuator, an on-blade actuator, or the like.

The example of FIG. 8 has five representative cross-feeds. A first cross-feed 801 is a lateral cyclic to longitudinal cyclic cross-feed based on providing longitudinal cyclic to cancel the pitch moment generated by a change in the lateral cyclic. A second cross-feed 802 is a longitudinal cyclic to lateral cyclic cross-feed based on providing lateral cyclic to cancel the roll moment generated by a change in the longitudinal cyclic. A third cross-feed 803 is a pedal axis (e.g., tail rotor collective) to longitudinal cyclic cross-feed based on providing longitudinal cyclic to cancel the pitch moment of the tail rotor collective. A fourth cross-feed 804 is a tail rotor collective to lateral cyclic cross-feed based on providing lateral cyclic to cancel the roll moment of, e.g., the tail rotor collective. A fifth cross-feed 805 is a main rotor collective to tail rotor collective cross-feed based on providing tail rotor collective to cancel the yaw moment of the main rotor collective.

Although FIG. 8 is representatively illustrated with five cross-feeds, more, fewer, or different cross-feed arrangements may be utilized. In general, cross-feeds may be utilized whenever a pilot provides a command to change a first flight characteristic, where changing the first flight characteristic would result in an expected change to a second flight characteristic. The cross-feed may result in an instruction to change a first operating condition of the FCS in response to a received pilot command, and an instruction to change a second operating condition in response to the expected change to the second flight characteristic. This second instruction could at least partially offset, counteract, or otherwise address the expected change to the second flight characteristic.

Representative embodiments appreciate that applying cross-feeds to "decouple" an aircraft having coupled flight dynamics may reduce pilot workload by automatically applying cross-feed commands without pilot intervention. For example, in some embodiments, applying decoupling cross-feeds may reduce or eliminate the need for a pilot to apply commands through pilot controls that are intended to at least partially offset coupled motions of the aircraft. In some circumstances, the FCS may apply cross-feed inputs faster than a pilot could manually. For example, the cross-feeds may anticipate (and therefore more quickly address) inherently coupled aircraft motions or flight characteristics.

The cyclic control assembly 262 may be configured to operate as a displacement-trim device such that movements of the longitudinal stick correlate to the position of the swashplate. In such an example, applying cross-feeds to anticipate inherent coupling of aircraft motions may result in the stick position failing to accurately represent a position of the swashplate, unless or until the trim motor back-drives the pilot control device to match swashplate position. Continuously driving the stick, especially at high frequency due to aircraft dynamics, however, may increase the workload of the pilot trim system and may increase pilot fatigue by transferring transient motions of the swashplate to the pilot's hand and forcing the pilot's hand to follow the stick as the swashplate moves.

Accordingly, teachings of representative embodiments recognize capabilities to wash out cross-feeds over short periods of time such that a displacement-trim flight control device substantially reflects the position of the swashplate during steady-state flight, but does not reflect the position of the swashplate during short transient periods. For example, the trim motor may drive the stick in certain conditions (e.g., during auto-pilot-controlled flight or establishing a new trim position), but the FCC may be configured to not command the trim motor to move the pilot control stick in response to application of the cross-feed. In some embodiments, the FCC may be configured to command the motor to move the pilot control stick based on positions of the swashplate during steady-state conditions, and may be configured to not command the motor to move the pilot control stick during transitory conditions.

The wash-out time period may be less than about ten seconds (e.g., about 2-7 seconds). In some embodiments, a wash-out time period begins when the cross-feed is first applied. In other embodiments, a wash-out time period begins after the aircraft returns to steady-state. In some embodiments, the aircraft returns to a same steady-state condition as existing before the cross-feed was applied. In other embodiments, a new steady-state condition may be established after the cross-feed is applied.

Elements of the cross-feed arrangement 800 may be implemented at least partially by one or more computer systems 10. All, some, or none of the components of the cross-feed arrangement 800 may be located on or near an aircraft, such as the rotorcraft 100.

Users 5 may access the cross-feed arrangement 800 through the computer systems 10. For example, in some embodiments, the users 5 may provide flight control inputs that may be processed using a computer system 10. The users 5 may include any individual, group of individuals, entity, machine, or mechanism that interacts with computer systems 10. Examples of the users 5 include, but are not limited to, a pilot, a copilot, a service person, an engineer, a technician, a contractor, an agent, an employee, or the like.

The computer system 10 may include processors 12, input/output devices 14, network interfaces 16, and a memory 18. In other embodiments, the computer system 10 may include more, less, or other components. The computer system 10 may be operable to perform one or more operations of various embodiments. Although representatively illustrated embodiments illustrate one example of a computer system 10 that may be used, other embodiments may utilize computers other than the computer system 10. Other embodiments may employ multiple computer systems 10 or other computers networked together in one or more public or private computer networks, such as one or more networks 30.

The processors 12 represent devices operable to execute logic contained within a computer-readable medium. Examples of the processor 12 include one or more microprocessors, one or more applications, virtual machines, or other logic. The computer system 10 may include one or multiple processors 12.

The input/output devices 14 may include any device or interface operable to enable communication between the computer system 10 and external components, including communication with a user or another system. Examples of the input/output devices 14 may include, but are not limited to, a mouse, a keyboard, a display, a printer, or the like.

The network interfaces 16 may be operable to facilitate communication between the computer system 10 and another element of a network, such as other computer systems 10. The network interfaces 16 (e.g., a communications link) may connect to any number or combination of wired or wireless networks suitable for data transmission, including transmission of communications.

The memory 18 represents any suitable storage mechanism and may store any data for use by the computer system 10. The memory 18 may comprise one or more tangible, computer-readable, or computer-executable storage medium. In some embodiments, the memory 18 stores logic 20. The logic 20 facilitates the operation of the computer system 10. The logic 20 may include hardware, software, or other logic. The logic 20 may be encoded in one or more tangible, non-transitory media and may perform operations when executed by a computer. The logic 20 may include a computer program, software, computer executable instructions, or instructions capable of being executed by computer system 10.

Various communications within the computer system 10 or between components of the computer system 10 may occur across a network, such as the network 30. The network 30 may represent any number and combination of networks suitable for data transmission. The network 30 may, for example, communicate internet protocol packets, frame relay frames, asynchronous transfer mode cells, or other suitable data between network addresses. Although representatively illustrated embodiments show one network 30, other embodiments may include more or fewer networks 30. Not all elements comprising various network embodiments may communicate via a network. Representative aspects and implementations will appreciate that communications over a network is one example of a mechanism for communicating between parties, and that any suitable mechanism may be used.

Figure 9:
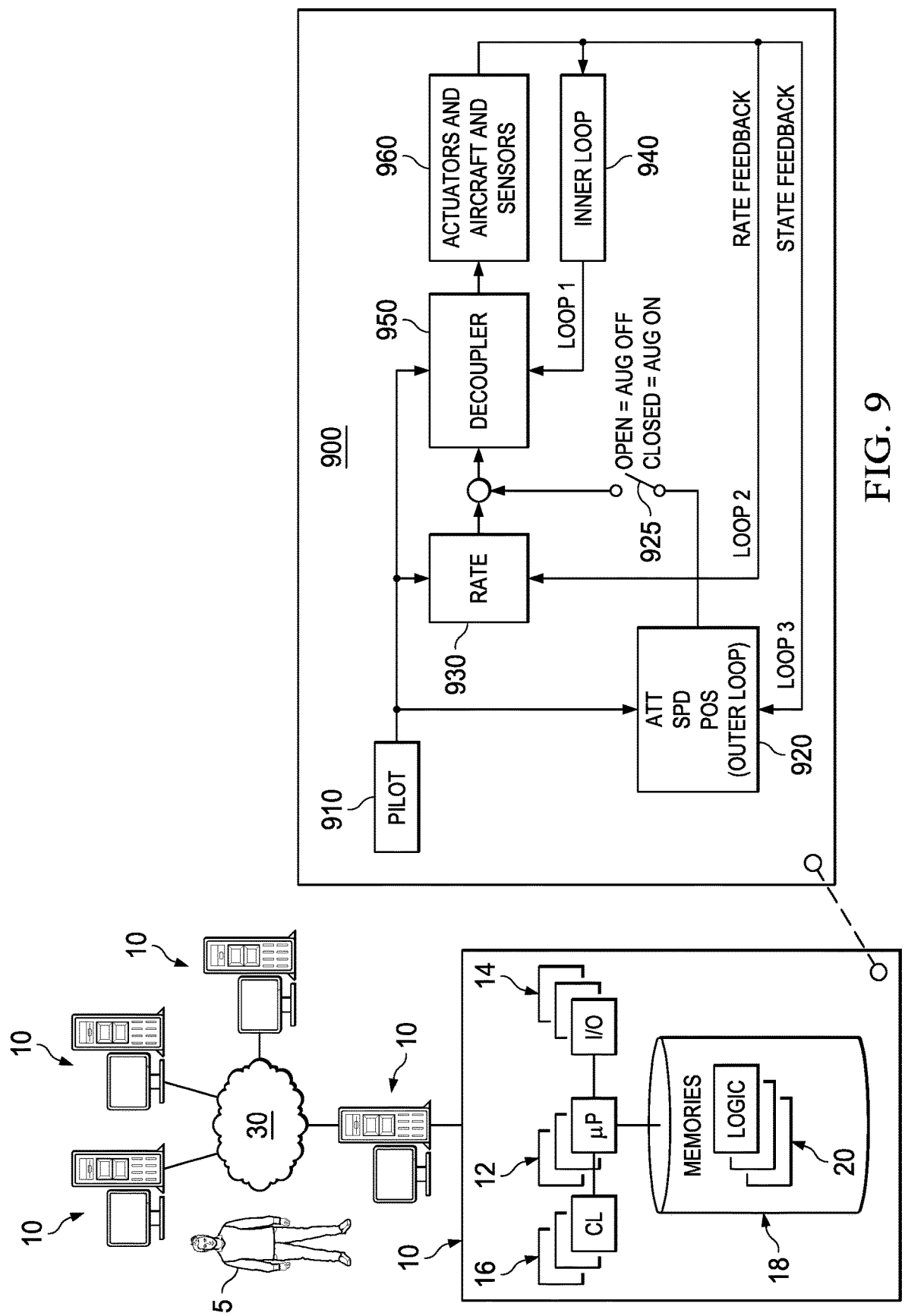
FIG. 9 illustrates a three-loop flight control system according to some embodiments.

FIG. 9 representatively illustrates a three-loop FCS 900 according to an embodiment. Like the cross-feed arrangement 800 of FIG. 8, elements of the three-loop FCS 900 may be implemented at least partially by one or more computer systems 10. All, some, or none of the components of the three-loop FCS 900 may be located on or near an aircraft such as a rotorcraft 100.

The three-loop FCS 900 of FIG. 9 has a pilot input 910, an outer loop 920, a rate (middle) loop 930, an inner loop 940, a decoupler 950, and aircraft equipment 960. Examples of the inner loop 940 and the decoupler 950 may include, but are not limited to, the cross-feed arrangement 800 and the inner loop 850 of FIG. 8. Representative examples of the aircraft equipment 960 may include, but are not limited to, the actuator position converter 860 and the actuators 870 of FIG. 8.

In the example of FIG. 9, a three-loop design separates the inner stabilization and rate feedback loops from outer guidance and tracking loops. The control law structure primarily assigns the overall stabilization task to the inner loop 940. Next, the middle loop 930 provides rate augmentation. The outer loop 920 focuses on guidance and tracking tasks. Since the inner loop 940 and the rate loop 930 provide most of the stabilization, less control effort is required at the outer loop level. As representatively illustrated in FIG. 9, a switch 925 is provided to turn the third-loop flight augmentation on and off.

In some embodiments, the inner loop and the rate loop include a set of gains and filters applied to the roll/pitch/yaw 3-axis rate gyro and the acceleration feedback sensors. Both the inner loop and the rate loop may stay active, independent of various outer loop hold modes. The outer loop 920 may include cascaded layers of loops, including an attitude loop, a speed loop, a position loop, a vertical speed loop, an altitude loop, and a heading loop.

The sum of the inner loop 940, the rate loop 930, and the outer loop 920 are applied to the decoupler 950. The decoupler 950 approximately decouples the 4-axes (pitch, roll, yaw, and collective pitch (vertical)) such that, for example, forward longitudinal stick input does not require the pilot to push the stick diagonally for manual deconvolution. Similarly, as collective pull increases torque and results in an increased anti-torque requirement, the decoupler 950 may provide both the necessary pedal and a portion of cyclic (e.g., if the rotorcraft 100 has a canted tail rotor) to counter the increased torque. In accordance with representative embodiments, the decoupling of plural flight characteristics allows for a control-law-automated, -mediated, or at least -assisted change in the pitch angle, the roll angle, the yaw rate, or the collective pitch angle, e.g., attending the performance of an approach maneuver (e.g., an offshore approach).

Figure 10:
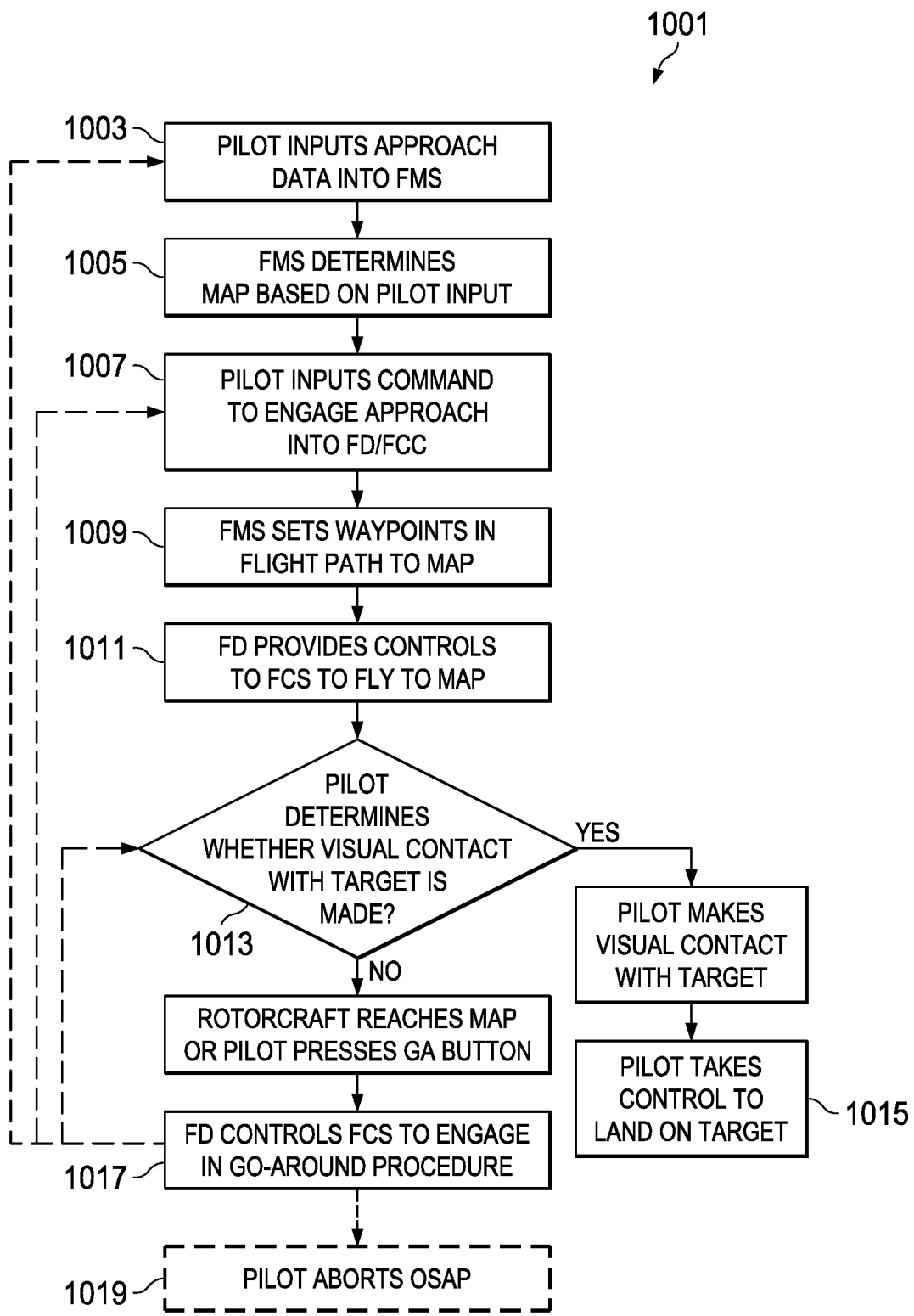
FIG. 10 illustrates a flow diagram of a method for landing a rotorcraft on an offshore target according to some embodiments.

FIG. 10 illustrates a flow diagram of a method 1001 for landing a rotorcraft 100 on an offshore target according to some embodiments. The method 1001 may be an offshore standard approach procedure (OSAP). In block 1003, a pilot of the rotorcraft 100 enters approach data into a flight management system (FMS) of the rotorcraft 100. The approach data may include the location of the offshore target, the direction of approach, the type of approach to be made, and the minimum altitude for a missed approach point (MAP). In some embodiments, some of the approach data may automatically be populated. For example, the FMS may include default settings for the approach type and the minimum altitude for the MAP. The FMS may also automatically determine the approach direction based on a detected wind direction. Thus, the pilot may only be required to enter the location of the offshore target. The pilot may enter the approach data into the FMS at any time during a flight, or even before a flight.

The direction of approach may be based on the wind direction and wind speed at the target location. The direction of approach is set such that the rotorcraft 100 approaches the offshore target from the upwind direction. The rotorcraft 100 may include systems for detecting the wind direction and wind speed at the rotorcraft 100. The FMS may set the direction of approach automatically based on the wind direction and wind speed detected by the rotorcraft 100. However, in some cases, the wind direction and wind speed at the target location may be different from the wind direction and wind speed at the rotorcraft 100. Thus, the pilot may enter the wind direction and wind speed at the offshore target. The type of approach may be one of a Delta 30° OSAP or a parallel offset OSAP, the details of each of which will be discussed in detail below. The minimum MAP altitude may be set to a minimum value, such as about 200 feet, by default. However, the pilot may increase the minimum altitude above the default value. For example, if the offshore target is unusually high, the pilot may increase the minimum MAP altitude.

In block 1005, the FMS determines the location of the MAP based on the pilot's inputs. In block 1007, the pilot inputs a command to engage the approach. The pilot may input the command to engage the approach into a flight director (FD) in the rotorcraft 100 or the FCC of the rotorcraft 100. In block 1009, the FMS sets waypoints between the current location of the rotorcraft 100 and the MAP. The FMS may automatically calculate a flight path based on the current location of the rotorcraft 100 and the approach data input by the pilot. The FMS then sets waypoints along the flight path to fly to the MAP. If the MAP is located on the opposite side of the offshore target as the rotorcraft 100, the FMS may set the waypoints such that the rotorcraft flies over the offshore target and performs a teardrop turn to approach the MAP from the correct direction. The waypoints may include an offshore initial approach fix (OSIAF), an offshore final approach fix (OSFAF), an offshore decision point altitude (OSDPA), a minimum descent altitude (MDA), and the MAP. In some embodiments, the FMS may calculate the OSIAF, the OSFAF, and the OSDPA based on the approach data and the location of the rotorcraft 100, while the MDA and the MAP may be set based on the approach data alone. When the Delta 30° OSAP is selected, the waypoints may further include an offshore Delta 30° turning point (OS30P). The FD may fly to each waypoint and transition to the next waypoint based on the location of the rotorcraft 100.

In block 1011, the FD provides controls to the FCS to fly the rotorcraft 100 to the MAP. In block 1013, the pilot determines whether visual contact is made with the offshore target. If the pilot makes visual contact with the offshore target, the method 1001 proceeds to block 1015 and the pilot takes control of the rotorcraft 100 in order to land the rotorcraft on the offshore target. The pilot may take control of the rotorcraft 100 at any point along the offshore approach. For example, the pilot may take control of the rotorcraft 100 after the rotorcraft 100 has flown to the OSIAF once visual contact with the offshore target has been made.

In block 1017, if the rotorcraft reaches the MAP or the pilot presses a go-around (GA) button, the FD controls the FCS to engage in a go-around procedure (discussed in greater detail below). After the go-around procedure is completed, the pilot may choose to abort the OSAP in block 1019 if visual contact with the offshore target has not been made; return to block 1003 and alter the approach data input into the FMS; return to block 1007 and attempt to engage another approach; or return to block 1013 and continue to attempt to make visual contact with the offshore target.

Figure 11A:
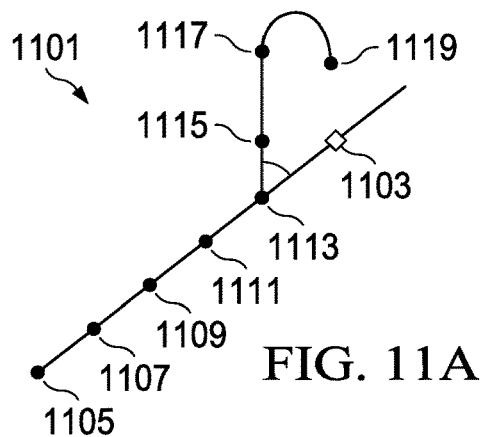
FIGS. 11A and 11B illustrate a plurality of waypoints set for a Delta 30° approach to an offshore target according to some embodiments.
Figure 11B:
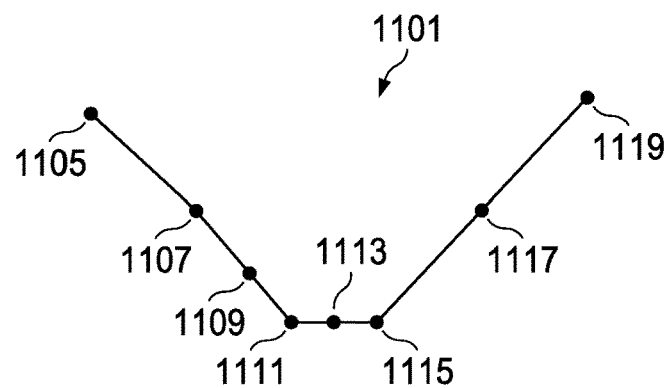

FIGS. 11A and 11B illustrate flight approach path 1101 including a plurality of waypoints set by the FMS for a Delta 30° approach to an offshore target 1103. FIG. 11A illustrates the plurality of waypoints from a top-down view and FIG. 11B illustrates the altitudes of the plurality of waypoints. The waypoints include an OSIAF 1105, an OSFAF 1107, an OSDPA 1109, an MDA 1111, an OS30P 1113, and an MAP 1115. The OSIAF 1105 may be located a distance of 6 nautical miles (NM) from the offshore target at an altitude of between about 1,000 ft MSL and about 1,500 ft MSL, such as about 1,300 ft MSL. The OSIAF 1105 may have a minimum altitude value, such as about 900 ft MSL. The altitude of the OSIAF 1105 may be input by the pilot in block 1005 of the method 1001. The OSFAF 1107 may be located a distance 3.9 NM from the offshore target at an altitude of 900 ft MSL. The OSFAF 1107 may not be input or altered by the pilot. The OSDPA 1109 may be located a distance 2.6 NM from the offshore target at an altitude of 500 ft MSL. The OSDPA 1109 may not be input or altered by the pilot. The MDA 1111 may be located a distance of less than 1.6 NM from the offshore target at an altitude of at least 200 ft radio altimeter (RA) or 250 ft MSL if the rotorcraft 100 does not include an operable RA. The altitude of the MDA 1111 may be raised by the pilot, but may not be lowered below 200 ft RA or 250 ft MSL. In some embodiments, the pilot may raise the MDA 1111 altitude if the offshore target 1103 is unusually high. The OS30P 1113 and the MAP 1115 may be located distances of 1.1 NM and 0.6 NM from the offshore target 1103, respectively. The altitude of the OS30P 1113 and the MAP 1115 may be the same as the altitude of the MDA 1111.

As illustrated in FIG. 11A, the rotorcraft 100 may fly directly towards the offshore target 1103 from the OSIAF 1105 to the OS30P 1113. Once the rotorcraft 100 reaches the OS30P 1113, the rotorcraft may turn at an angle of 30 degrees to proceed to the MAP 1115. Although FIG. 11A illustrates a left-hand turn at the OS30P 1113, the rotorcraft 100 may alternatively make a right-hand turn at the OS30P 1113 to proceed to the MAP 1115 (not separately illustrated). The pilot may input a Delta 30° left approach or a Delta 30° right approach at block 1005 of the method 1001 to make a left-hand turn or a right-hand turn at the OS30P 1113, respectively, depending on personal preferences.

The FCS flies the rotorcraft 100 to the offshore target 1103 by flying to each of the waypoints, the OSIAF 1105, the OSFAF 1107, the OSDPA 1109, the MDA 1111, the OS30P 1113, and the MAP 1115 in order. Upon reaching the OSFAF 1107, the rotorcraft 100 may decelerate to a ground speed of less than 75 knots or a ground speed of less than 70 knots. The rotorcraft 100 may further decelerate to a ground speed of less than 45 knots upon reaching the MDA 1111, before reaching the OS30P 1113.

If the pilot does not make visual contact with the offshore target 1103 by the time the rotorcraft reaches the MAP 1115, or the pilot presses the GA button, the FCS engages in a go-around procedure. The go-around procedure includes flying the rotorcraft 100 to a first point 1117 in the Delta 30° heading and climbing to an altitude of 900 ft MSL. The rotorcraft 100 then executes a climbing turn towards the offshore target 1103 and climbs to an altitude of 2000 ft MSL at a second point 1119. If there is a missed approach, the pilot may attempt to alter the approach data, engage another approach, continue to attempt to make visual contact with the offshore target, or abort the OSAP.

Figure 12A:
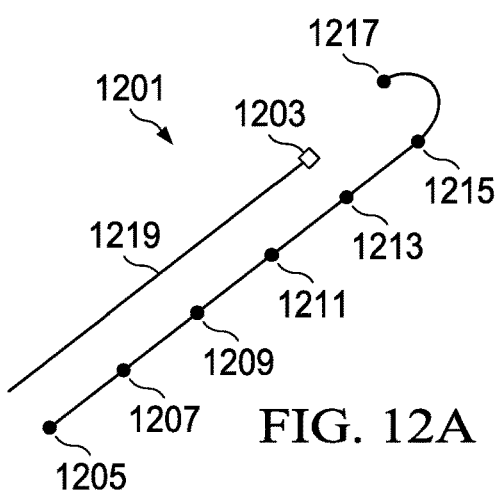
FIGS. 12A and 12B illustrate a plurality of waypoints set for a parallel offset approach to an offshore target according to some embodiments.
Figure 12B:
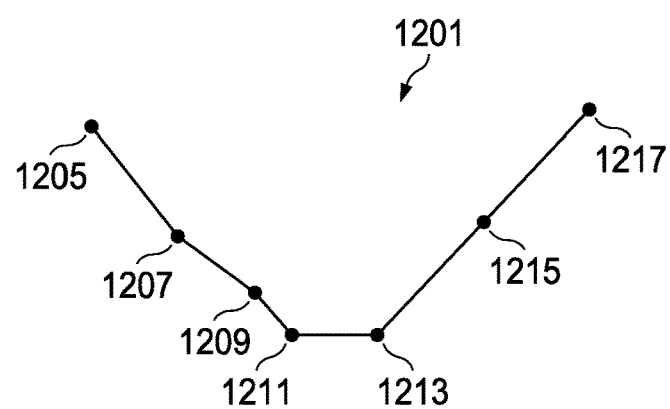

FIGS. 12A and 12B illustrate flight approach path 1201 including a plurality of waypoints set by the FMS for a parallel offset approach to an offshore target 1203. FIG. 12A illustrates the plurality of waypoints from a top-down view and FIG. 12B illustrates the altitudes of the plurality of waypoints. The waypoints include an OSIAF 1205, an OSFAF 1207, an OSDPA 1209, an MDA 1211, and an MAP 1213. The OSIAF 1205 may be located a distance of 6 nautical miles (NM) from the offshore target at an altitude of between about 1,000 ft MSL and about 1,500 ft MSL, such as about 1,500 ft MSL. The OSIAF 1205 may have a minimum altitude value, such as about 900 ft MSL. The altitude of the OSIAF 1205 may be input by the pilot in block 1005 of the method 1001. The OSFAF 1207 may be located a distance 3.9 NM from the offshore target at an altitude of 900 ft MSL. The OSFAF 1207 may not be input or altered by the pilot. The OSDPA 1209 may be located a distance 2.4 NM from the offshore target at an altitude of 500 ft MSL. The OSDPA 1209 may not be input or altered by the pilot. The MDA 1211 may be located a distance of less than 1.5 NM from the offshore target at an altitude of at least 200 ft radio altimeter (RA) or 250 ft MSL if the rotorcraft 100 does not include an operable RA. The altitude of the MDA 1211 may be raised by the pilot, but may not be lowered below 200 ft RA or 250 ft MSL. In some embodiments, the pilot may raise the MDA 1211 altitude if the offshore target 1203 is unusually high. The MAP 1213 may be located a distance of 0.7 NM from the offshore target 1203.

As illustrated in FIG. 12A, the FMS may set the waypoints for the parallel offset approach such that the rotorcraft flies along a path parallel to a direct path 1219 to the offshore target 1203. The flight path set by the FMS may be offset from the direct path 1219 by 0.5 NM. The FMS may set the flight path for the parallel offset approach on either the left side of the offshore target 1203 or the right side of the offshore target 1203, depending on the pilot's input in block 1005 of the method 1001. More specifically, the pilot may input an offset left approach or an offset right approach into the FMS in block 1005. The pilot may choose a right-hand approach or a left-hand approach based on personal preferences.

The FCS flies the rotorcraft 100 to the offshore target 1203 by flying to each of the waypoints, the OSIAF 1205, the OSFAF 1207, the OSDPA 1209, the MDA 1211, and the MAP 1213 in order. Upon reaching the OSFAF 1207, the rotorcraft 100 may decelerate to a ground speed of less than 75 knots or a ground speed of less than 70 knots. The rotorcraft 100 may further decelerate to a ground speed of less than 45 knots upon reaching the MDA 1211.

If the pilot does not make visual contact with the offshore target 1203 by the time the rotorcraft reaches the MAP 1213, or the pilot presses the GA button, the FCS engages in a go-around procedure. The go-around procedure includes flying the rotorcraft 100 to a first point 1215 in the parallel offset heading and climbing to an altitude of 900 ft MSL. The rotorcraft 100 then executes a climbing turn towards the offshore target 1203 and climbs to an altitude of 2000 ft MSL at a second point 1217. If there is a missed approach, the pilot may attempt to alter the approach data, engage another approach, continue to attempt to make visual contact with the offshore target, or abort the OSAP.

Figure 13:
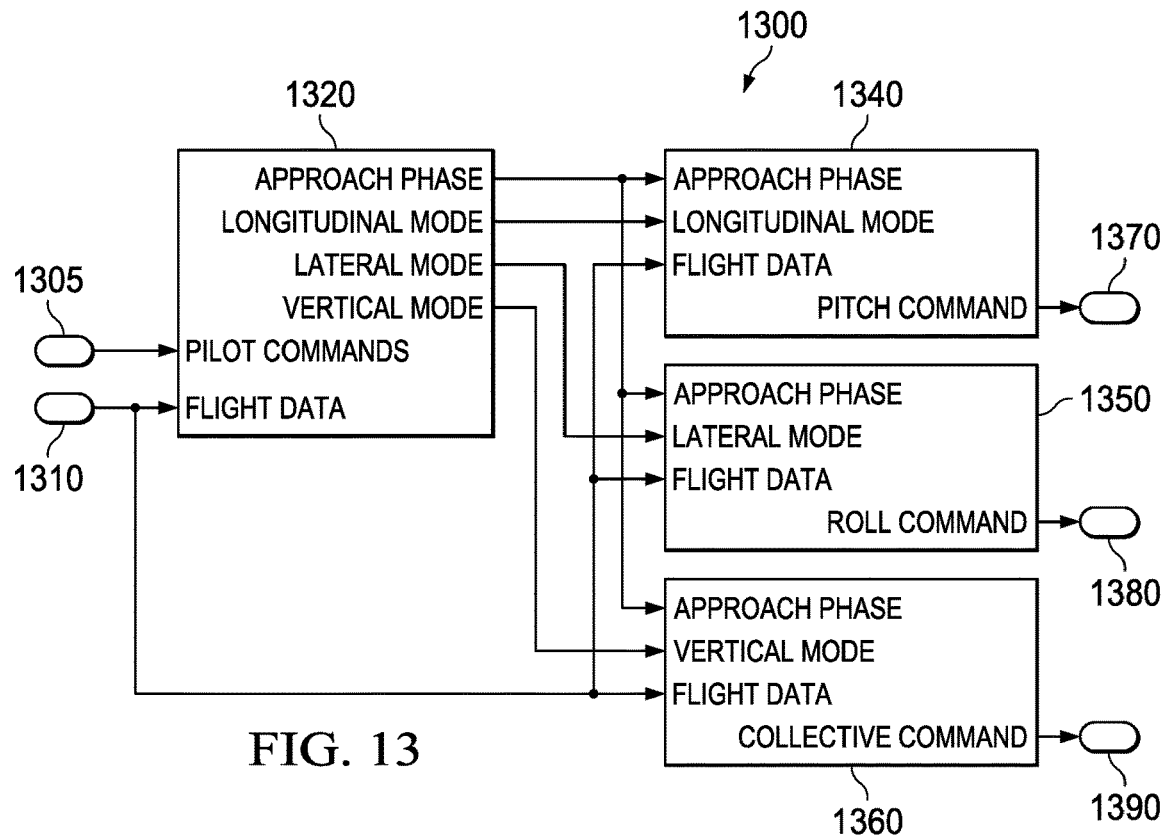
FIG. 13 illustrates offshore standard approach procedure logic that may be implemented by a flight control computer according to some embodiments.

FIG. 13 illustrates OSAP logic 1300 that may be implemented by the FMS and the FCS of the rotorcraft 100. Pilot command data 1305 (e.g., commands from the cyclic control assembly 262, the collective control assembly 264, and the pedal assembly 266) and sensor data 1310 (e.g., flight data obtained from sensors on the rotorcraft 100 or received by the rotorcraft 100) are provided to the OSAP logic block 1320. The output of the OSAP logic block 1320 corresponds to data indicating which phase of the OSAP the rotorcraft 100 is currently engaging in. The OSAP logic block 1320 provides the approach phase data to a longitudinal control block 1340, a lateral control block 1350, and a collective control block 1360. The OSAP logic block 1320 may further output data indicating which longitudinal mode, lateral mode, and vertical mode the rotorcraft 100 is currently engaging in. The OSAP logic block 1320 provides the longitudinal mode data to the longitudinal control block 1340, the lateral mode data to the lateral control block 1350, and the vertical mode data to the collective control block 1360.

The longitudinal control block 1340 operates on approach phase data from the OSAP logic block 1320, longitudinal mode data from the OSAP logic block 1320, and flight data from the sensor data 1310 in order to produce a pitch command 1370. In a representative embodiment, the pitch command 1370 is provided by the FMS to the FCS for implementation to affect an increase or decrease in pitch angle attending performance of a component pitch motion of the OSAP maneuver.

The lateral control block 1350 operates on approach phase data from the OSAP logic block 1320, lateral mode data from the OSAP logic block 1320, and flight data from the sensor data 1310 in order to produce a roll command 1380. In a representative embodiment, the roll command 1380 is provided by the FMS to the FCS for implementation to affect an increase or decrease in roll angle or yaw rate attending performance of a component roll motion of the OSAP maneuver.

The collective control block 1360 operates on approach phase data from the OSAP logic block 1320, vertical mode data from the OSAP logic block 1320, and flight data from the sensor data 1310 in order to produce a collective command 1390. In a representative embodiment, the collective command 1390 is provided by the FMS to the FCS for implementation to affect an increase or decrease in collective rate attending performance of a component collective motion of the OSAP maneuver.

Figure 14:
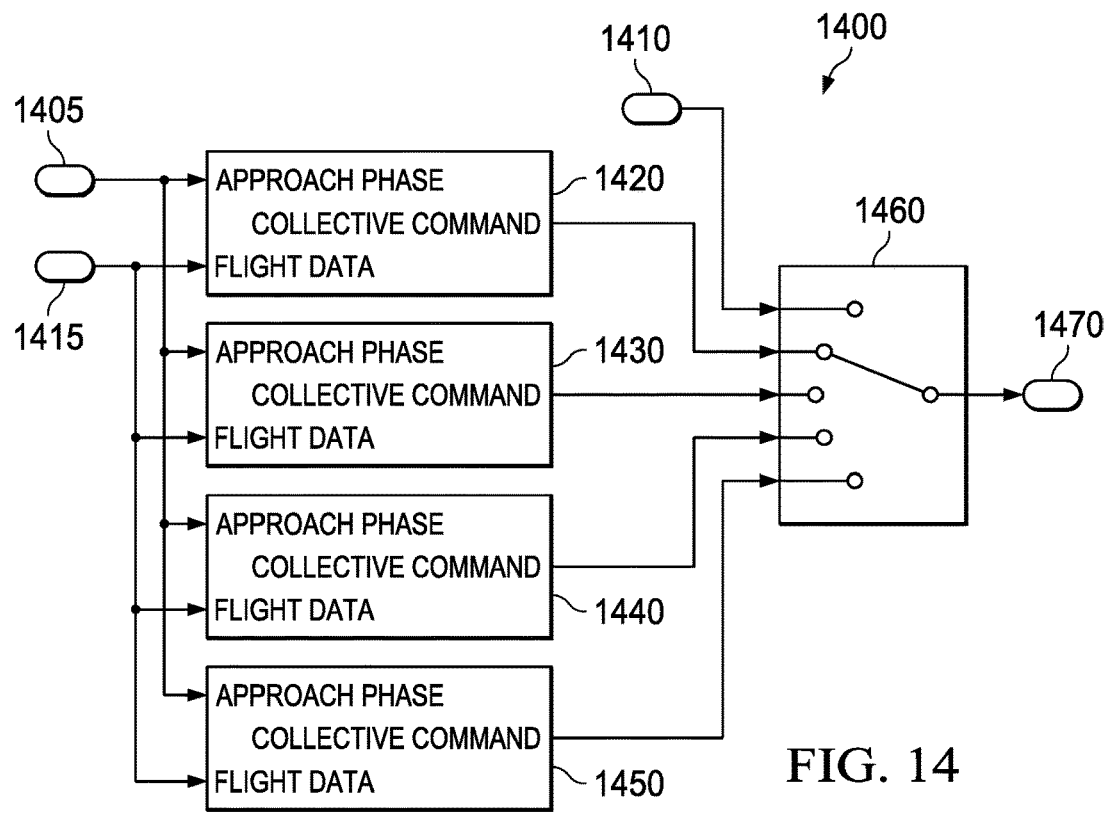
FIG. 14 illustrates collective mode logic that may be implemented by a flight control computer according to some embodiments.

FIG. 14 illustrates collective mode logic 1400 that may be implemented by the FMS and the FCS of the rotorcraft 100. Approach phase data 1405 (indicating which phase of the OSAP the rotorcraft 100 is currently engaging in) and flight data 1415 (including sensor data obtained from sensors on the rotorcraft 100 or received by the rotorcraft 100) are provided to a barometric altitude hold mode block 1420, a radio altitude hold mode block 1430, a flight path tracking mode block 1440, and a level-off mode block 1450. A collective multiport switch 1460 is configured to allow selection of a collective mode 1410 from a barometric altitude hold mode, a radio altitude hold mode, a flight path tracking mode, or a level-off mode to produce a collective command 1470. In some embodiments, the collective command 1470 is provided by the FMS to the FCS for implementation to affect an increase or decrease in collective pitch attending performance of a component collective motion of the OSAP maneuver corresponding to the mode selected by the collective multiport switch 1460.

Figure 15:
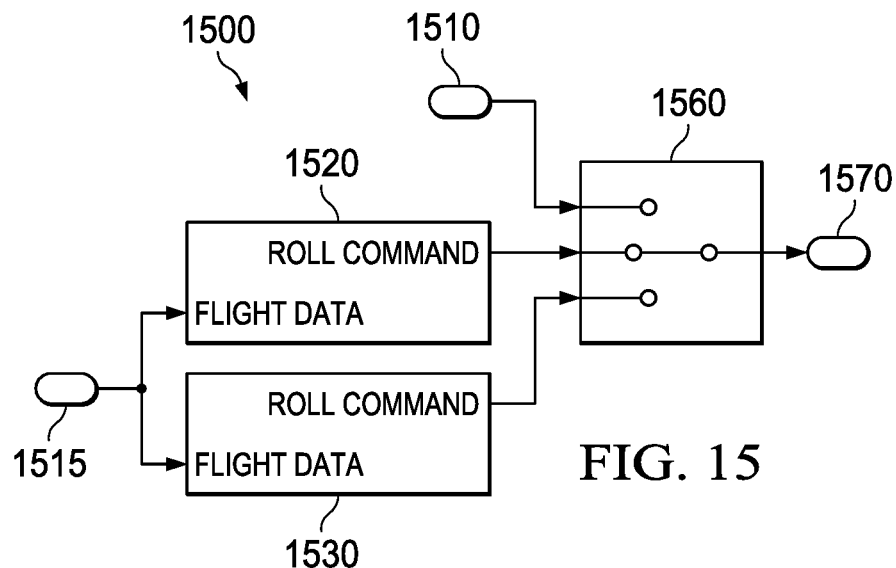
FIG. 15 illustrates lateral mode logic that may be implemented by a flight control computer according to some embodiments.

FIG. 15 illustrates lateral mode logic 1500 that may be implemented by the FMS and the FCS of the rotorcraft 100. Approach phase data 1505 (indicating which phase of the OSAP the rotorcraft 100 is currently engaging in) and flight data 1515 (including sensor data obtained from sensors on the rotorcraft 100 or received by the rotorcraft 100) are provided to a heading/ground tracking mode block 1520, a course tracking mode block 1530. A lateral multiport switch 1560 is configured to allow selection of a lateral mode 1510 from a heading/ground track mode or a course tracking mode in order to produce a lateral command 1570. In some embodiments, the lateral command 1570 is provided by the FMS to the FCS for implementation to affect an increase or decrease in roll angle or yaw rate attending performance of a component lateral motion of the OSAP maneuver corresponding to the mode selected by the lateral multiport switch 1560.

Figure 16:
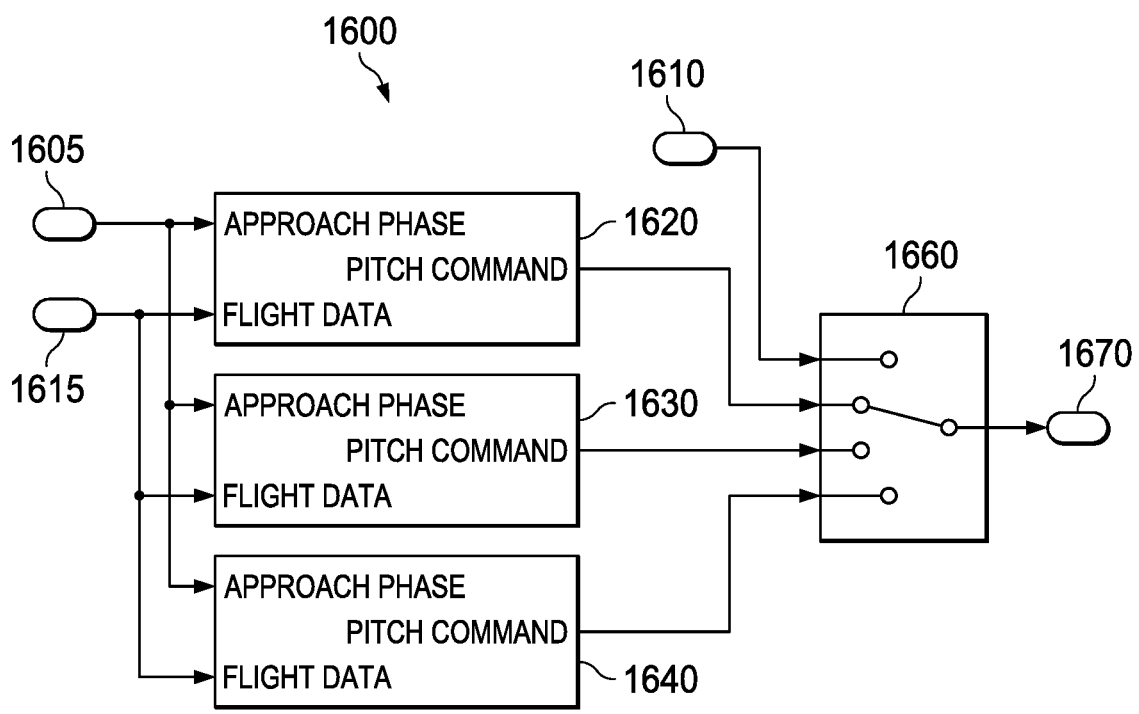
FIG. 16 illustrates longitudinal mode logic that may be implemented by a flight control computer according to some embodiments.

FIG. 16 illustrates longitudinal mode logic 1600 that may be implemented by the FMS and the FCS of the rotorcraft 100. Approach phase data 1605 (indicating which phase of the OSAP the rotorcraft 100 is currently engaging in) and flight data 1615 (including sensor data obtained from sensors on the rotorcraft 100 or received by the rotorcraft 100) are provided to an airspeed control mode block 1620, a decelerate mode block 1630, and a groundspeed control mode block 1640. A longitudinal multiport switch 1660 is configured to allow selection of a longitudinal mode 1610 from an airspeed control mode, a decelerate mode, or a groundspeed control mode to produce a longitudinal command 1670. In some embodiments, the longitudinal command 1670 is provided by the FMS to the FCS for implementation to affect an increase or decrease in pitch attending performance of a component longitudinal motion of the OSAP maneuver corresponding to the mode selected by the longitudinal multiport switch 1660.

Figure 17:
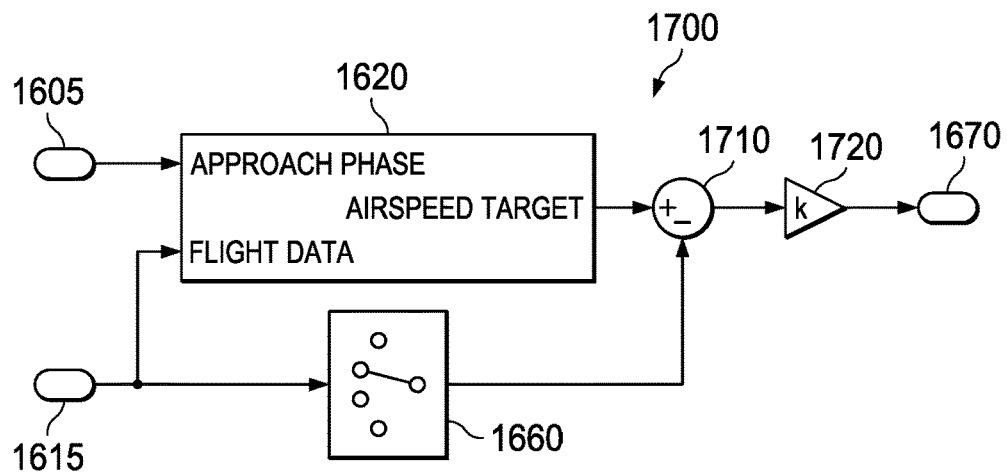
FIG. 17 illustrates a forward velocity airspeed control component that may be implemented by a flight control computer according to some embodiments.

FIG. 17 illustrates a forward velocity airspeed control component 1700 of the OSAP maneuver that may be implemented by the FMS and the FCS of the rotorcraft 100. In an embodiment as representatively illustrated in FIG. 17, the FMS and FCS may be configured to engage a forward velocity airspeed control component 1700 of an approach-to-hover maneuver. The approach phase data 1605 and the flight data 1615 may be provided to the airspeed control mode block 1620. The airspeed control mode block 1620 provides a target airspeed output to an airspeed control comparator 1710. The longitudinal multiport switch 1660 provides mode-selected airspeed flight data to the airspeed control comparator 1710. The airspeed control comparator 1710 determines a vector difference between the mode-selected airspeed flight data and the desired or computed forward velocity for the then-current approach phase. For example, the absolute value (or magnitude) of the difference between the sensed airspeed and the desired forward velocity is determined, as well as the sign (or direction) of the difference (e.g., positive indicating acceleration to achieve the desired forward velocity, negative indicating deceleration to achieve the desired forward velocity). The output of the airspeed control comparator 1710 is provided to an airspeed control gain stage 1720, where K indicates a desired acceleration or deceleration. The output from the airspeed control gain stage 1720 is provided as the longitudinal command 1670. In accordance some embodiments, the longitudinal command 1670 is provided by the FMS to the FCS for implementation to affect an increase or decrease in pitch attending performance of a component longitudinal motion of the OSAP maneuver corresponding to the selection of the airspeed control mode.

Figure 18:
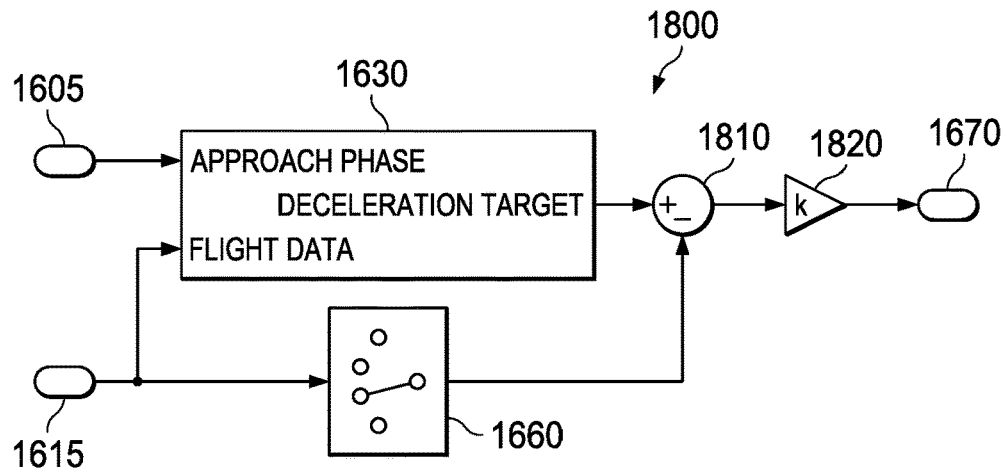
FIG. 18 illustrates a forward velocity decelerate component that may be implemented by a flight control computer according to some embodiments.

FIG. 18 illustrates a forward velocity decelerate component 1800 of the OSAP maneuver that may be implemented by the FMS and the FCS of the rotorcraft 100. The approach phase data 1605 and the flight data 1615 may be provided to the decelerate mode block 1630. The decelerate mode block 1630 provides target airspeed output to a decelerate comparator 1810. The longitudinal multiport switch 1660 provides mode-selected airspeed flight data to the decelerate comparator 1810. The decelerate comparator 1810 determines a vector difference between the mode-selected airspeed flight data and the desired or computed forward velocity for the then-current approach phase. For example, the absolute value (or magnitude) of the difference between the sensed airspeed and the desired forward velocity is determined, as well as the sign (or direction) of the difference (e.g., positive indicating acceleration to achieve the desired forward velocity, negative indicating deceleration to achieve the desired forward velocity). The output of the decelerate comparator 1810 is provided to a decelerate gain stage 1820, where K indicates a desired acceleration or deceleration. The output from the decelerate gain stage 1820 is provided as the longitudinal command 1670. The longitudinal command 1670 may be provided by the FMS to the FCS for implementation to affect an increase or decrease in pitch attending performance of a component longitudinal motion of the OSAP maneuver corresponding to the selection of the decelerate mode.

Figure 19:
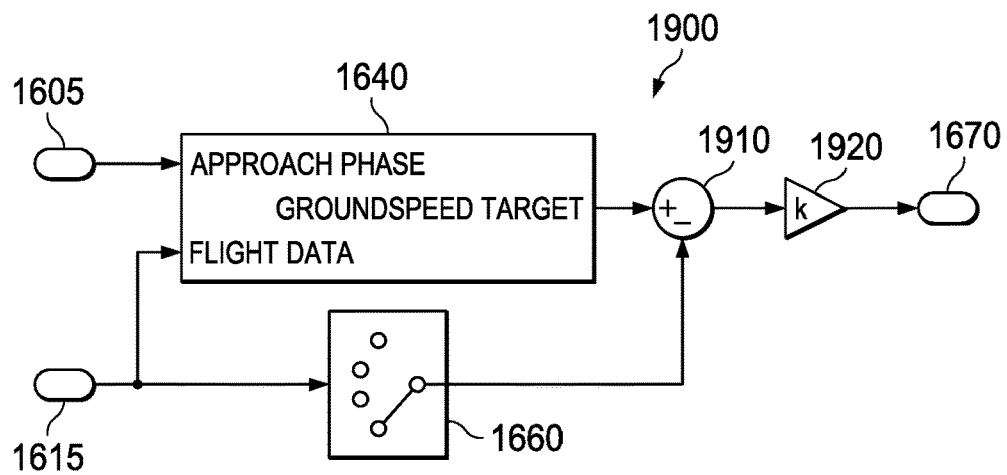
FIG. 19 illustrates a forward velocity groundspeed control component that may be implemented by a flight control computer according to some embodiments.

FIG. 19 illustrates a forward velocity groundspeed control component 1900 of the OSAP maneuver that may be implemented by the FMS and the FCS of the rotorcraft 100. The approach phase data 1605 and the flight data 1615 may be provided to the groundspeed control mode block 1640. The groundspeed control mode block 1640 provides target airspeed output to a groundspeed control comparator 1910. The longitudinal multiport switch 1660 provides mode-selected groundspeed flight data to the groundspeed control comparator 1910. The groundspeed control comparator 1910 determines a vector difference between the mode-selected groundspeed flight data and the desired or computed forward velocity for the then-current approach phase. For example, the absolute value (or magnitude) of the difference between the sensed groundspeed and the desired forward velocity is determined, as well as the sign (or direction) of the difference (e.g., positive indicating acceleration to achieve the desired forward velocity, negative indicating deceleration to achieve the desired forward velocity). The output of the groundspeed control comparator 1910 is provided to a groundspeed control gain stage 1920, where K indicates a desired acceleration or deceleration. The output from the groundspeed control gain stage 1920 is provided as the longitudinal command 1670. The longitudinal command 1670 may be provided by the FMS to the FCS for implementation to affect an increase or decrease in pitch attending performance of a component longitudinal motion of the OSAP maneuver corresponding to the selection of the groundspeed control mode.

Figure 20:
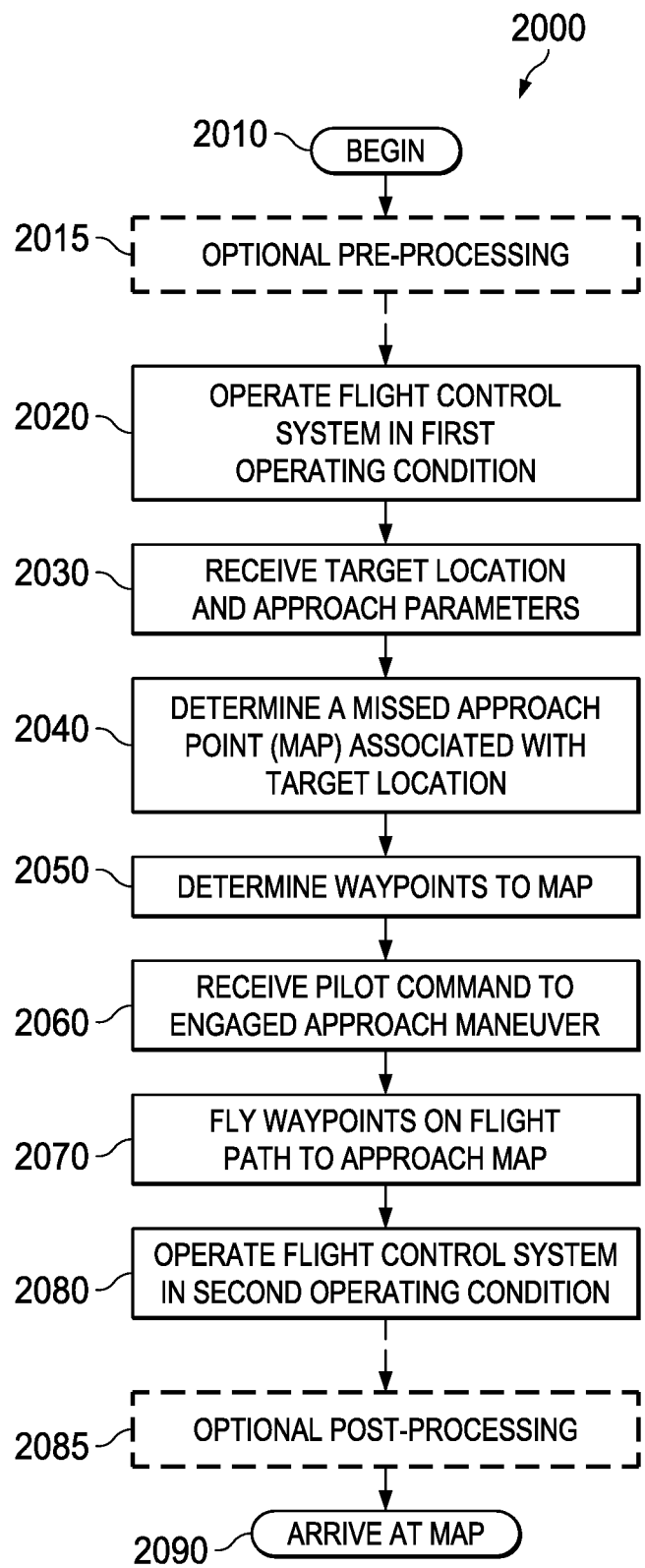
FIG. 20 illustrates a method for performing an offshore standard approach procedure according to some embodiments.

FIG. 20 illustrates a method 2000 for performing an OSAP in accordance with a representative embodiment. The method 2000 begins 2010 with an optional step 2015 of pre-processing. The optional pre-processing of step 2015 may include control laws performing various adjustments preliminary to (or during some portion of) the operation of the rotorcraft 100 in a first operating condition 2020 of the FCS. The method 2000 further includes a step 2030 of the FMS receiving a pilot command for a target location. In response to receiving the pilot command for the target location, the method 2000 further includes a step 2040 of the FMS designating a missed approach point (MAP). The method 2000 further includes a step 2050 of the FMS determining waypoints in a flight path to approach the MAP. After the FMS determines waypoints in the flight path to approach the MAP, the method 2000 further includes a step 2060 of the FD/FCC receiving a pilot command to engage in an approach maneuver. In response to the pilot command to engage in the approach maneuver, the method 2000 further includes a step 2070 of the rotorcraft 100 flying to the MAP. The FD instructs the FCS to alter conditions of the rotor system 110 in order to fly the rotorcraft 100 to the MAP along the flight path. In response to the FD/FCC engaging in the approach maneuver and the rotorcraft 100 flying to the MAP, the method 2000 further includes a step 2080 of the FCS transitioning to a second operating condition (or a series or sequence of second operating conditions) of the FCS, wherein the second operating condition (or series of the same) is operable to reduce the airspeed and to reduce the altitude attending the rotorcraft 100 approaching the MAP (e.g., 50 feet over the marked target location). The method 2000 further includes a step 2085 of optional post-processing. In some embodiments, the optional post-processing 2085 may include control laws performing various adjustments during or after the operation of the rotorcraft 100 in the first operating condition of the FCS. The method 2000 also includes a step 2090 of the rotorcraft 100 hovering over the marked target location of the MAP.

FIG. 21 illustrates a method 2100 for implementing an automated-, mediated-, or at least assisted-OSAP maneuver. The method 2100 begins 2110 with a step 2120 of operating the FCS of the rotorcraft 100 in an initial operating condition. The initial operating condition may be any condition of operating the FCS (e.g., generally regarded as a stable operating condition). For example, the initial operating condition may correspond to the rotorcraft 100 engaging in forward flight at a relatively constant, nonzero velocity. Step 2130 represents optional pre-processing that the FMS may engage in (or be engaged in) preliminary to the FMS receiving a pilot command to engage an OSAP maneuver in step 2140. For example, the optional pre-processing 2130 may include control laws performing various adjustments during the operation of the rotorcraft 100 in the initial operating condition 2120. After a pilot command to engage in an OSAP maneuver is received in step 2140, the FMS determines (in step 2145) a pitch angle, a roll angle, a yaw rate, or a collective pitch angle for turning the rotorcraft 100 into a downwind path to begin the OSAP maneuver. In step 2150, the FMS determines a pitch angle, a roll angle, a yaw rate, or a collective pitch angle for implementation in performance of the OSAP maneuver. Thereafter the FCS is transitioned to an interim operating condition in step 2160 (e.g., the interim operating condition corresponding to a component portion of the RTT maneuver for returning the rotorcraft 100 to an MAP). Thereafter, the OSAP maneuver processing is looped 2165 to iteratively or sequentially determine pitch angles, roll angles, yaw rates, or collective pitch angles for implementation in performance of subsequent phases of the OSAP maneuver. Steps 2150 and 2160 are looped 2165 until cancellation of the OSAP maneuver by the pilot in step 2180, or reaching the target location in step 2190. If the target location is reach, the rotorcraft 100 is placed in a hover above the target location in step 2190. If the pilot optionally cancels the OSAP maneuver, the rotorcraft 100 may be optionally returned to the initial operating condition existing prior to the engagement of the OSAP maneuver. The FMS may engage the optional post-processing in step 2170. For example, the optional post-processing 2170 may include control laws performing various automated control functions.

FIG. 22 illustrates a method 2200 providing further detail of the step 2160 (see FIG. 21) of transitioning the FCS to an interim operating condition. The method 2200 includes an optional pre-processing step 2262. The optional pre-processing step 2262 may include the same, similar, or different elements or steps as the optional pre-processing step 2130 of FIG. 21. In step 2264, the FMS makes a change to a first flight characteristic. In step 2266, the FMS changes a prior operating condition of the FCS to a subsequent operating condition of the FCS in correspondence to, in congruence with, or otherwise appreciating, an expected change in a second flight characteristic inherently-coupled to, or convolved with, the first flight characteristic (as previously discussed) in order to counteract or otherwise address the expected change in the second flight characteristic (e.g., main rotor tilt engagement to affect a roll maneuver may require modification of collective pitch). Thereafter optional post-processing may be performed in step 2268. The optional post-processing step 2268 may identically include or find correspondence to same, similar, or different elements as the optional post-processing step 2170 of FIG. 21. For example, some or all of the optional post-processing of step 2268 may be a subset of the optional post-processing step 2170 of FIG. 21.

Figure 23:
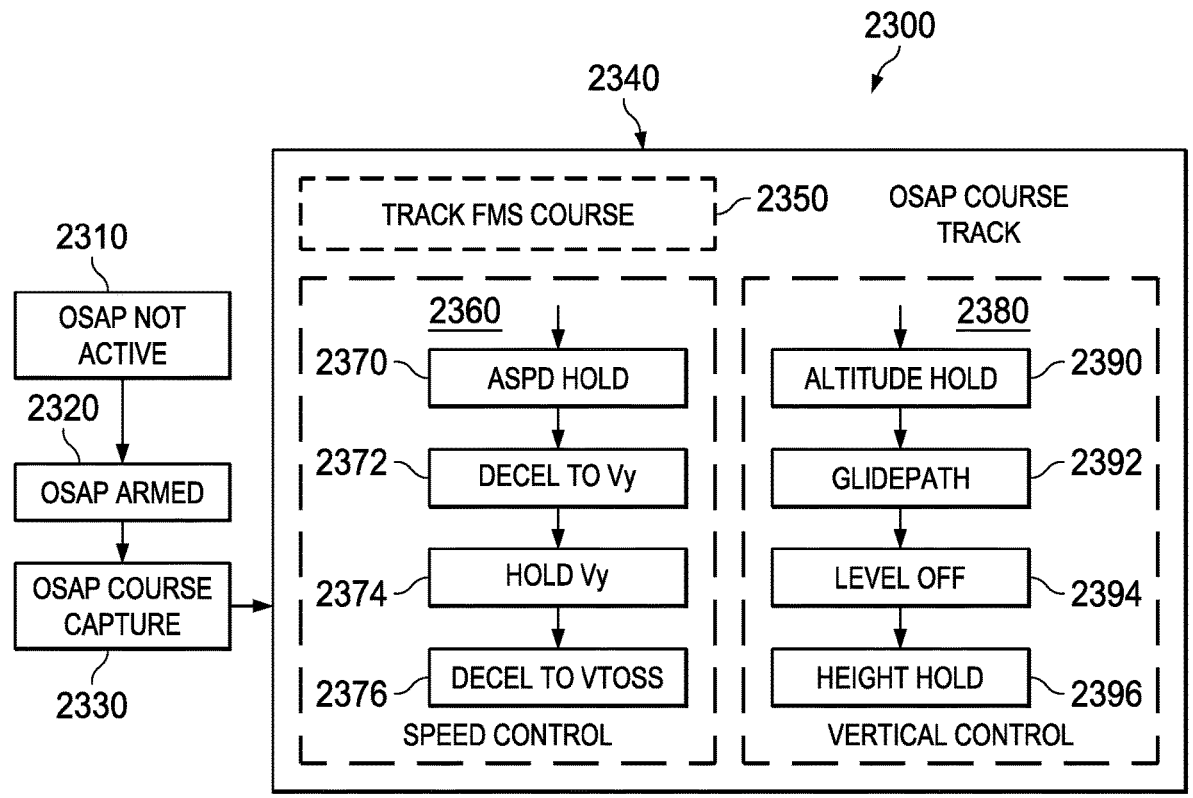
FIG. 23 illustrates a logic diagram of control logic for engaging in an offshore standard approach procedure according to some embodiments.

FIG. 23 illustrates a logic diagram of control logic 2300 for engaging an OSAP in the FMS. In block 2310, the OSAP is not active. In block 2310, the rotorcraft 100 may be operating in a first operating condition, such as forward flight at an airspeed of greater than 0 knots. In block 2320, the pilot of the rotorcraft 100 presses an OSAP button, and the OSAP is armed. In block 2330, the FMS captures a course. The FMS determines the rotorcraft 100's current location and approach data indicating an offshore target location, an approach direction, an approach type, and a minimum approach altitude. The FMS then sets waypoints between the current location of the rotorcraft 100 and a missed approach point (MAP) located a distance from the offshore target location.

Once the course is set and the OSAP has been engaged, the FMS commands the FCS to engage in the OSAP and the FMS tracks the course of the OSAP in block 3040. In block 2350, the FMS of the rotorcraft 100 tracks the course of the rotorcraft in the OSAP. The FMS may gather data from various sensors on the rotorcraft 100 and may also receive data from outside the rotorcraft 100 to track the position of the rotorcraft 100.

The control logic 2300 further includes a speed control block 2360 and a vertical control 2380. In block 2370, the rotorcraft 100 engages in an airspeed (ASPD) hold mode in which the rotorcraft moves to an offshore initial approach fix. Once the rotorcraft 100 reaches the offshore initial approach fix (OSIAF), the rotorcraft 100 decelerates to Vy in block 2372. Vy is the optimal climbing speed for the rotorcraft 100 and may, in some embodiments, be about 75 knots. The rotorcraft 100 then continues forward holding the forward velocity Vy in block 2374 until the rotorcraft 100 reaches the minimum descent altitude (MDA). The rotorcraft 100 then decelerates to Vtoss in block 2376 after reaching the MDA. Vtoss may be the safety takeoff speed for the rotorcraft 100 and, in some embodiments, may be about 45 knots.

The FMS holds the altitude of the rotorcraft 100 in block 2390 until the rotorcraft 100 reaches the OSIAF. In some embodiments, the initial altitude of the rotorcraft 100 may be about 1300 ft MSL or about 1500 ft MSL. Once the rotorcraft 100 reaches the OSIAF, the rotorcraft 100 engages a glidepath in block 2392 to decrease the altitude of the rotorcraft 100 to the MDA, which may be about 200 ft MSL. The rotorcraft 100 then levels off at the MDA in block 2394 and holds the MDA in block 2396.

Figure 24:
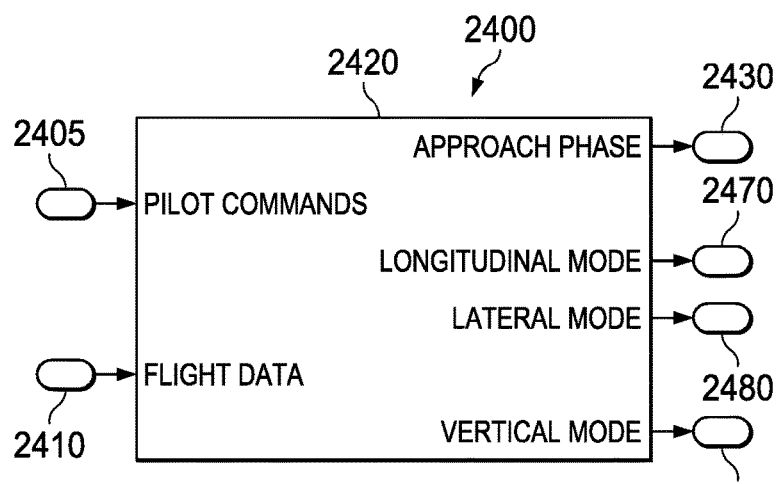
FIG. 24 illustrates an optional mode logic block that may be implemented by a flight control computer according to some embodiments.

FIG. 24 illustrates an optional mode logic block 2400. In some embodiments, the optional mode logic block 2400 may be included in the OSAP logic 1300 of FIG. 13. Pilot command data 2405 (e.g., commands from the cyclic control assembly 262, the collective control assembly 264, and the pedal assembly 266) and sensor data 2410 (e.g., flight data obtained from sensors on the rotorcraft 100 or received by the rotorcraft 100) are provided to the optional mode logic block 2400. The output of the optional mode logic block 2400 corresponds to data indicating the approach phase, the lateral mode, the longitudinal mode, and the vertical mode that are currently set in the rotorcraft 100. The optional mode logic block 2400 provides the approach phase date to the longitudinal control block 1340, the lateral control block 1350, and the collective control block 1360 of FIG. 13. The optional mode logic block 2400 further provides the lateral mode data to the lateral control block 1350, the longitudinal mode data to the longitudinal control block 1340, and the vertical mode data to the collective control block 1360 of FIG. 13.

The OSAP may be used to aid pilots in flying to an offshore target. A pilot is able to fly the rotorcraft 100 to an offshore target by only providing the location of the offshore target, or by providing a combination of the location of the offshore target and any of an approach direction, an approach type, and a minimum altitude for a missed approach point. The FMS automatically generates waypoints between the rotorcraft 100's current location and the missed approach point, thus the pilot does not have to calculate these waypoints.

In accordance with an embodiment, a rotorcraft includes a rotor system including a plurality of blades; a control assembly operable to receive commands from a pilot; a flight control system (FCS), the flight control system operable to control flight of the rotorcraft by changing an operating condition of the rotor system; and a flight management system (FMS) in signal communication with the control assembly and the FCS, the FMS being operable to receive a target location and a plurality of approach parameters from the control assembly; generate a plurality waypoints between a current location of the rotorcraft and a missed approach point (MAP) based on the target location and the plurality of approach parameters; receive a command to engage in an approach maneuver from the control assembly; and in response to the command to engage in the approach maneuver, instruct the FCS to fly to the MAP. In an embodiment, the plurality of approach parameters includes an approach type, an approach direction, and a minimum altitude. In an embodiment, the approach type includes a Delta 30° approach or a parallel offset approach. In an embodiment, the Delta 30° approach includes a right Delta 30° approach or a left Delta 30° approach and the parallel offset approach includes a right parallel offset approach or a left parallel offset approach. In an embodiment, the minimum altitude is equal to or greater than 200 feet mean sea level. In an embodiment, the rotorcraft further includes a wind sensor and the FMS sets a default approach direction based on the wind sensor. In an embodiment, the rotorcraft further includes a rotor system, and the FMS is further operable to: alter a first flight characteristic, wherein alteration of the first flight characteristic would result in an anticipated change in a second flight characteristic; and in response to the anticipated change to the second flight characteristic, instruct the FCS to change the operating condition of the rotor system to at least partially counter the anticipated change to the second flight characteristic such that the FCS is operable to at least partially separate convolved flight characteristics.

In another embodiment, a method for operating a rotorcraft includes inputting approach data into a flight management system (FMS), the flight control data including a target location, the target location including an offshore location; generating a plurality of waypoints in a flight path between a current location of the rotorcraft and a missed approach point (MAP) based on the approach data; commanding the FMS to engage in an approach maneuver; and altering a flight condition of the rotorcraft to fly the rotorcraft through each waypoint of the plurality of waypoints to the MAP. In an embodiment, the plurality of waypoints includes an offshore initial approach fix (OSIAF), an offshore final approach fix (OSFAF), an offshore decision point altitude (OSDPA), a minimum descent altitude (MDA), and the MAP, in order. In an embodiment, flying the rotorcraft from the OSIAF to the OSFAF includes decreasing the altitude of the rotorcraft from about 1,300 feet mean seal level (MSL) to about 900 feet MSL, flying the rotorcraft from the OSFAF to the OSDPA includes decreasing the altitude of the rotorcraft from about 900 feet mean seal level (MSL) to about 500 feet MSL, flying the rotorcraft from the OSDPA to the MDA includes decreasing the altitude of the rotorcraft from about 900 feet mean seal level (MSL) to a missed approach altitude, and flying the rotorcraft from the MDA to the MAP includes leveling off the altitude of the rotorcraft and maintaining a constant altitude. In an embodiment, the missed approach altitude is equal or greater than 200 feet MSL. In an embodiment, the method further includes decelerating the rotorcraft to 75 knots upon reaching the OSFAF and decelerating the rotorcraft to 45 knots upon reaching the MDA. In an embodiment, the plurality of waypoints further includes an offshore Delta 30° point (OS30P), the OS30P located between the MDA and the MAP. In an embodiment, altering the flight condition transitions the rotorcraft from a first operating condition to a second operating condition, transitioning the rotorcraft from the first operating condition to the second operating condition includes changing a first flight characteristic, changing the first flight characteristic would result in an expected change to a second flight characteristic, and the first flight characteristic and the second flight characteristic have an inherently-coupled relationship; instructing a flight control system (FCS) to change the first operating condition of the FCS based on the inherently-coupled relationship; and in response to the expected change to the second flight characteristic, instructing the FCS to transition to the second operating condition of the FCS, the second operating condition is operable to at least partially offset the expected change to the second flight characteristic such that the FCS is operable to at least partially decouple the inherently-coupled relationship of the first flight characteristic and the second flight characteristic.

In yet another embodiment, a device for a rotorcraft includes a processor; and a non-transitory computer-readable storage medium storing a program to be executed by the processor, the program including instructions for performing an offshore approach maneuver, the instructions for performing the offshore approach maneuver including instructions for generating a flight path in response to a user entering approach data, the flight path including a plurality of waypoints between a current location of the rotorcraft and a missed approach point (MAP), the approach data comprising a target location, the target location including an offshore location; and instructing the flight control system (FCS) to fly the rotorcraft to the MAP in response to the user entering an engage approach command. In an embodiment, the approach data includes an approach type, and the approach type is a Delta 30° approach or a parallel offset approach. In an embodiment, the instructions for performing the offshore approach maneuver further include instructions for receiving a wind direction from a wind sensor on the rotorcraft, and setting an approach direction based on the wind direction. In an embodiment, the plurality of waypoints include an offshore initial approach fix (OSIAF), an offshore final approach fix (OSFAF), an offshore decision point altitude (OSDPA), a minimum descent altitude (MDA), and the MAP, in order. In an embodiment, the MAP is 0.6 nautical miles (NM) from the target location when the Delta 30° approach is selected and the MAP is 0.7 NM from the target location when the parallel offset approach is selected. In an embodiment, the OSIAF is located 6 NM from the target location, the OSFAF is located 3.8 NM from the target location, the OSDPA is located 2.6 NM from the target location when the Delta 30° approach is selected or 2.4 NM from the target location when the parallel offset approach is selected, and the MDA is located less than 1.6 NM from the target location when the Delta 30° approach is selected or less than 1.5 NM from the target location when the parallel offset approach is selected.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft comprising:
a rotor system comprising a plurality of blades;
a control assembly operable to receive commands from a pilot;
a flight control system (FCS), the flight control system operable to control flight of the rotorcraft by changing an operating condition of the rotor system;
a flight management system (FMS) in signal communication with the control assembly and the FCS, the FMS being operable to:
  receive a target location and a plurality of approach parameters from the control assembly;
  generate a missed approach point (MAP) based on the target location and the plurality of approach parameters, wherein the MAP is generated independent of a current location of the rotorcraft;
  after generating the MAP, receive a command to engage in an approach maneuver from the control assembly;
  after receiving the command to engage in the approach maneuver, generate a plurality waypoints between the current location of the rotorcraft and the MAP based on the target location, the current location of the rotorcraft, and the plurality of approach parameters; and
  in response to the command to engage in the approach maneuver, instruct the FCS to fly to the MAP; and
a go-around button in signal communication with the FCS, wherein the FCS is operable to engage in a go-around procedure in response to the go-around button being engaged.

2. The rotorcraft of claim 1, wherein the plurality of approach parameters comprises an approach type, an approach direction, and a minimum altitude.

3. The rotorcraft of claim 2, wherein the approach type comprises a Delta 30° approach or a parallel offset approach.

4. The rotorcraft of claim 3, wherein the Delta 30° approach comprises a right Delta 30° approach or a left Delta 30° approach and the parallel offset approach comprises a right parallel offset approach or a left parallel offset approach.

5. The rotorcraft of claim 2, wherein the minimum altitude is equal to or greater than 200 feet mean sea level.

6. The rotorcraft of claim 2, further comprising a wind sensor, wherein the FMS sets a default approach direction based on the wind sensor.

7. The rotorcraft of claim 1, further comprising a rotor system, wherein the FMS is further operable to:
alter a first flight characteristic, wherein alteration of the first flight characteristic would result in an anticipated change in a second flight characteristic; and
in response to the anticipated change to the second flight characteristic, instruct the FCS to change the operating condition of the rotor system to at least partially counter the anticipated change to the second flight characteristic such that the FCS is operable to at least partially separate convolved flight characteristics.

8. A method for operating a rotorcraft, the method comprising:
inputting approach data into a flight management system (FMS), the approach data comprising a target location, the target location comprising an offshore location;
generating a plurality of waypoints in a flight path between a current location of the rotorcraft and a missed approach point (MAP) based on the approach data;
commanding the FMS to engage in an approach maneuver;
after commanding the FMS to engage in the approach maneuver, turning the rotorcraft into a downwind path to begin the approach maneuver;
after turning the rotorcraft into the downwind path, altering a flight condition of the rotorcraft to fly the rotorcraft through each waypoint of the plurality of waypoints to the MAP; and
in response to a missed approach, inputting altered approach data into the FMS.

9. The method of claim 8, wherein the plurality of waypoints comprises an offshore initial approach fix (OSIAF), an offshore final approach fix (OSFAF), an offshore decision point altitude (OSDPA), a minimum descent altitude (MDA), and the MAP, in order.

10. The method of claim 9, wherein flying the rotorcraft from the OSIAF to the OSFAF comprises decreasing the altitude of the rotorcraft from about 1,300 feet mean seal level (MSL) to about 900 feet MSL, wherein flying the rotorcraft from the OSFAF to the OSDPA comprises decreasing the altitude of the rotorcraft from about 900 feet mean seal level (MSL) to about 500 feet MSL, wherein flying the rotorcraft from the OSDPA to the MDA comprises decreasing the altitude of the rotorcraft from about 900 feet mean seal level (MSL) to a missed approach altitude, and wherein flying the rotorcraft from the MDA to the MAP comprises leveling off the altitude of the rotorcraft and maintaining a constant altitude.

11. The method of claim 10, wherein the missed approach altitude is equal or greater than 200 feet MSL.

12. The method of claim 9, further comprising decelerating the rotorcraft to 75 knots upon reaching the OSFAF and decelerating the rotorcraft to 45 knots upon reaching the MDA.

13. The method of claim 9, wherein the plurality of waypoints further comprises an offshore Delta 30° point (OS30P), the OS30P located between the MDA and the MAP.

14. The method of claim 8, wherein altering the flight condition transitions the rotorcraft from a first operating condition to a second operating condition, wherein transitioning the rotorcraft from the first operating condition to the second operating condition comprises:
changing a first flight characteristic, wherein changing the first flight characteristic would result in an expected change to a second flight characteristic, and wherein the first flight characteristic and the second flight characteristic have an inherently-coupled relationship;
instructing a flight control system (FCS) to change the first operating condition of the FCS based on the inherently-coupled relationship; and
in response to the expected change to the second flight characteristic, instructing the FCS to transition to the second operating condition of the FCS, wherein the second operating condition is operable to at least partially offset the expected change to the second flight characteristic such that the FCS is operable to at least partially decouple the inherently-coupled relationship of the first flight characteristic and the second flight characteristic.

15. A device for a rotorcraft comprising:

a processor; and a non-transitory computer-readable storage medium storing a program to be executed by the processor, the program including instructions for performing an offshore approach maneuver, the instructions for performing the offshore approach maneuver including instructions for:

generating a flight path in response to a user entering approach data, the flight path comprising a plurality of waypoints between a current location of the rotorcraft and a missed approach point (MAP), the approach data comprising a target location, the target location comprising an offshore location, wherein in response to the MAP being disposed on an opposite side of the target location from the current location of the rotorcraft, the flight path passes over the target location and comprises a teardop turn;

instructing a flight control system (FCS) to fly the rotorcraft to the MAP in response to the user entering an engage approach command;

instructing the FCS to hover the rotorcraft over the MAP in response to the rotorcraft reaching the MAP; and instructing the FCS to fly the rotorcraft in a go-around procedure in response to the user engaging a go-around button;

wherein the program further includes an offshore standard approach procedure (OSAP) logic block, the OSAP logic block outputting approach phase data, longitudinal mode data, lateral mode data, and vertical mode data based on pilot command data and sensor data.

16. The device of claim 15, wherein the approach data comprises an approach type, wherein the approach type is a Delta 30° approach or a parallel offset approach.

17. The device of claim 16, wherein the instructions for performing the offshore approach maneuver further include instructions for receiving a wind direction from a wind sensor on the rotorcraft, and setting an approach direction based on the wind direction.

18. The device of claim 16, wherein the plurality of waypoints comprises an offshore initial approach fix (OSIAF), an offshore final approach fix (OSFAF), an offshore decision point altitude (OSDPA), a minimum descent altitude (MDA), and the MAP, in order.

19. The device of claim 18, wherein the MAP is 0.6 nautical miles (NM) from the target location when the Delta 30° approach is selected and the MAP is 0.7 NM from the target location when the parallel offset approach is selected.

20. The device of claim 19, wherein the OSIAF is located 6 NM from the target location, the OSFAF is located 3.8 NM from the target location, the OSDPA is located 2.6 NM from the target location when the Delta 30° approach is selected or 2.4 NM from the target location when the parallel offset approach is selected, and the MDA is located less than 1.6 NM from the target location when the Delta 30° approach is selected or less than 1.5 NM from the target location when the parallel offset approach is selected.

* * * * *

UNITED STATES PATENT AND TRADEMARK OFFICE
CERTIFICATE OF CORRECTION

PATENT NO. : 10,890,924 B2
APPLICATION NO. : 15/961439
DATED : January 12, 2021
INVENTOR(S) : Robert Earl Worsham, II Page 1 of 1

It is certified that error appears in the above-identified patent and that said Letters Patent is hereby corrected as shown below:

In the Claims

In Column 25, Line 23, Claim 15, delete "teardop" and insert --teardrop--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*